United States Patent [19]
Sekine

[11] Patent Number: 5,805,304
[45] Date of Patent: Sep. 8, 1998

[54] IMAGE PROCESSING APPARATUS

[75] Inventor: Hiroshi Sekine, Kanagawa, Japan

[73] Assignee: Fuji Xerox Co., Ltd., Tokyo, Japan

[21] Appl. No.: 522,447

[22] Filed: Aug. 31, 1995

[30] Foreign Application Priority Data

Sep. 1, 1994 [JP] Japan .................................. 6-232299

[51] Int. Cl.⁶ .............................. H04M 1/41; H04M 1/40
[52] U.S. Cl. .................... 358/448; 358/429; 358/434; 358/447; 358/451; 358/456; 358/458; 358/462; 382/173; 382/299
[58] Field of Search ..................................... 358/448, 447, 358/458, 434, 456, 462, 457, 451, 401, 429, 455; 382/173, 299; 395/102, 117, 109

[56] References Cited

U.S. PATENT DOCUMENTS

| | | |
|---|---|---|
| 4,437,122 | 3/1984 | Walsh et al. . |
| 4,831,392 | 5/1989 | Dei ......................................... 364/519 |
| 4,847,641 | 7/1989 | Tung . |
| 4,905,097 | 2/1990 | Watanabe et al. ...................... 358/456 |
| 5,029,108 | 7/1991 | Lung . |
| 5,038,223 | 8/1991 | Yamada ................................... 358/445 |
| 5,109,283 | 4/1992 | Carley . |
| 5,200,841 | 4/1993 | Kotaki et al. ........................... 358/455 |
| 5,257,116 | 10/1993 | Suzuki .................................... 358/447 |
| 5,258,854 | 11/1993 | Eschbach ................................ 358/445 |
| 5,541,740 | 7/1996 | Mori ....................................... 358/447 |
| 5,568,597 | 10/1996 | Nakayama et al. ..................... 395/132 |
| 5,619,242 | 4/1997 | Haneda et al. .......................... 358/298 |

FOREIGN PATENT DOCUMENTS 2-62260  3/1990  Japan .

Primary Examiner—Edward L. Coles, Sr.
Assistant Examiner—Mark Wallerson
Attorney, Agent, or Firm—Finnegan, Henderson, Farabow, Garret & Dunner, L.L.P.

[57] ABSTRACT

Input bit map image data having a resolution of 600 dpi is converted into multivalue image data MI having a resolution of 600 dpi by a binary-to-multivalue converting unit. The multivalue image data MI is converted into multivalue image data having a resolution of 400 dpi by a resolution converting unit. The edge direction of the multivalue image data is detected by an edge direction detecting unit, so as to obtain an edge direction detection flag. Based on the edge direction detection flag, an image data outputting unit outputs multivalue image data having a resolution of 400 dpi from the edge direction detecting unit.

6 Claims, 28 Drawing Sheets

| PATTERN CONTENTS OF DATA BLOCK PD (VALUES OF INPUT BINARY IMAGE BMa TO BMi) | VALUE OF OUTPUT MULTIVALUE IMAGE DATA MI |
|---|---|
| A ~ D OF FIG. 9 | 255 |
| A ~ D OF FIG. 5 | 207 |
| A1 ~ D2 OF FIG. 6 | 159 |
| A1 ~ D2 OF FIG. 8 | 96 |
| A ~ D OF FIG. 7 | 48 |
| A ~ D OF FIG. 10 | 0 |

| 0 | 0 | - |
|---|---|---|
| 1 | 0 | 0 |
| - | 1 | 0 |

B

| 0 | 1 | - |
|---|---|---|
| 0 | 0 | 1 |
| - | 0 | 0 |

C

| - | 0 | 0 |
|---|---|---|
| 0 | 0 | 1 |
| 0 | 1 | - |

D

| - | 1 | 0 |
|---|---|---|
| 1 | 0 | 0 |
| 0 | 0 | - |

| 1 | 0 | - |
|---|---|---|
| 1 | 0 | 0 |
| - | 1 | 0 |

A2

| 0 | 0 | - |
|---|---|---|
| 1 | 0 | 0 |
| - | 1 | 1 |

B1

| 1 | 1 | - |
|---|---|---|
| 0 | 0 | 1 |
| - | 0 | 0 |

B2

| 0 | 1 | - |
|---|---|---|
| 0 | 0 | 1 |
| - | 0 | 1 |

C1

| - | 0 | 1 |
|---|---|---|
| 0 | 0 | 1 |
| 0 | 1 | - |

C2

| - | 0 | 0 |
|---|---|---|
| 0 | 0 | 1 |
| 1 | 1 | - |

D1

| - | 1 | 1 |
|---|---|---|
| 1 | 0 | 0 |
| 0 | 0 | - |

D2

| - | 1 | 0 |
|---|---|---|
| 1 | 0 | 0 |
| 1 | 0 | - |

| 0 | 0 | - |
|---|---|---|
| ☐ | 0 | 0 |
| - | ■ | 0 |

B

| 0 | ☐ | - |
|---|---|---|
| 0 | 0 | ■ |
| - | 0 | 0 |

C

| - | 0 | 0 |
|---|---|---|
| 0 | 0 | ☐ |
| 0 | ■ | - |

D

| - | ☐ | 0 |
|---|---|---|
| ■ | 0 | 0 |
| 0 | 0 | - |

| OUTPUT MULTIVALUE IMAGE DATA | OPERATION EXPRESSIONS |
|---|---|
| MRs | $\dfrac{MIa + MIb/2 + MId/2 + MIe/4}{2.25}$ |
| MRt | $\dfrac{MIb/2 + MIc + MIe/4 + MIf/2}{2.25}$ |
| MRu | $\dfrac{MId/2 + MIe/4 + MIg + MIh/2}{2.25}$ |
| MRv | $\dfrac{MIe/4 + MIf/2 + MIh/2 + MIi}{2.25}$ |

| 255 | 255 | 255 |
|---|---|---|
| 128 | 128 | 128 |
| 0 | 0 | 0 |

A2

| 0 | 0 | 0 |
|---|---|---|
| 128 | 128 | 128 |
| 255 | 255 | 255 |

B1

| 255 | 128 | 0 |
|---|---|---|
| 255 | 128 | 0 |
| 255 | 128 | 0 |

B2

| 0 | 128 | 255 |
|---|---|---|
| 0 | 128 | 255 |
| 0 | 128 | 255 |

C1

| 255 | 255 | 128 |
|---|---|---|
| 255 | 128 | 0 |
| 128 | 0 | 0 |

C2

| 0 | 0 | 128 |
|---|---|---|
| 0 | 128 | 255 |
| 128 | 255 | 255 |

D1

| 128 | 255 | 255 |
|---|---|---|
| 0 | 128 | 255 |
| 0 | 0 | 128 |

D2

| 128 | 0 | 0 |
|---|---|---|
| 255 | 128 | 0 |
| 255 | 255 | 128 |

FIG. 19

| DETECT VALUE DATA OF WHICH ABSOLUTE VALUE IS MAXIMUM | | EDGE DIRECTION | EDGE DIRECTION DETECTION FLAG EH |
|---|---|---|---|
| EG1 | POSITIVE | UPWARD | 01 |
| | NEGATIVE | DOWNWARD | |
| EG2 | POSITIVE | LEFTWARD | 11 |
| | NEGATIVE | RIGHTWARD | 10 |
| EG3 | POSITIVE | LEFTWARD | 11 |
| | NEGATIVE | RIGHTWARD | 10 |
| EG4 | POSITIVE | RIGHTWARD | 10 |
| | NEGATIVE | LEFTWARD | 11 |

FIG. 20

| EDGE DIRECTION DETECTION FLAG EF | EDGE DIRECTION |
|---|---|
| 00 | NO EDGE |
| 01 | UPWARD OR DOWNWARD |
| 10 | RIGHTWARD |
| 11 | LEFTWARD |

FIG. 23

| EDGE DIRECTION DETECTION FLAG EF | EDGE DIRECTION | REFERENCE WAVE | |
|---|---|---|---|
| | | ODD-NUMBERED PIXEL PERIOD | EVEN-NUMBERED PIXEL PERIOD |
| 00 | NO EDGE | TRIANGULAR WAVE Sa | TRIANGULAR WAVE Sa |
| 01 | UPWARD OR DOWNWARD | TRIANGULAR WAVE Sb | TRIANGULAR WAVE Sb |
| 10 | RIGHTWARD | TRIANGULAR WAVE Sc | TRIANGULAR WAVE Sd |
| 11 | LEFTWARD | TRIANGULAR WAVE Sd | TRIANGULAR WAVE Sc |

FIG. 27
A
| 255 | 255 | 255 |
|---|---|---|
| 128 | 128 | 128 |
| 0 | 0 | 0 |
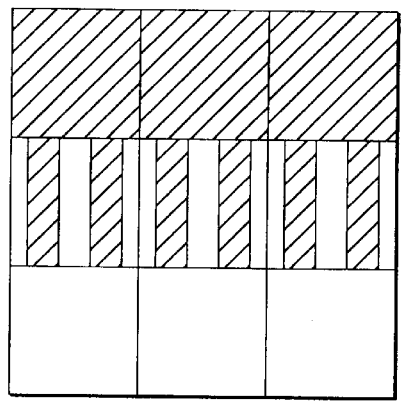
B
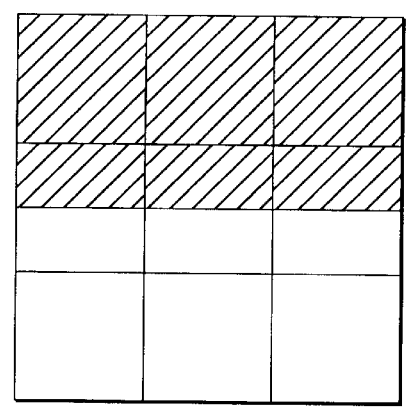
C

FIG. 28

BM (600dpi)

| PB1 | P1 | | | | | | | | 2 | | | | |
|---|---|---|---|---|---|---|---|---|---|---|---|---|---|
| 0 | 0 | 0 | 0 | 1 | 1 | 0 | 0 | 0 | 0 | 0 | 0 | 0 | 0 |
| 0 | 0 | 0 | 0 | 0 | 1 | 1 | 0 | 0 | 0 | 0 | 0 | 0 | 0 |
| 0 | 0 | 0 | 0 | 0 | 1 | 1 | 0 | 0 | 0 | 0 | 0 | 0 | 0 |
| 0 | 0 | 0 | 0 | 0 | 0 | 1 | 1 | 0 | 0 | 0 | 0 | 0 | 0 |
| 0 | 0 | 0 | 0 | 0 | 0 | 1 | 1 | 0 | 0 | 0 | 0 | 0 | 0 |
| 0 | 0 | 0 | 0 | 0 | 0 | 0 | 1 | 1 | 0 | 0 | 0 | 0 | 0 |
| 0 | 0 | 0 | 0 | 0 | 0 | 0 | 1 | 1 | 0 | 0 | 0 | 0 | 0 |
| 0 | 0 | 0 | 0 | 0 | 0 | 0 | 0 | 1 | 1 | 0 | 0 | 0 | 0 |

MI(600dpi)

| QB1 | | | QB2 | | | QB3 | | | QB4 | | |
|---|---|---|---|---|---|---|---|---|---|---|---|
| 0 | 0 | 0 | 96 | 255 | 159 | 0 | 0 | 0 | 0 | 0 | 0 |
| 0 | 0 | 0 | 0 | 159 | 255 | 96 | 0 | 0 | 0 | 0 | 0 |
| 0 | 0 | 0 | 0 | 96 | 255 | 159 | 0 | 0 | 0 | 0 | 0 |
| 0 | 0 | 0 | 0 | 0 | 159 | 255 | 96 | 0 | 0 | 0 | 0 |
| 0 | 0 | 0 | 0 | 0 | 96 | 255 | 159 | 0 | 0 | 0 | 0 |
| 0 | 0 | 0 | 0 | 0 | 0 | 159 | 255 | 96 | 0 | 0 | 0 |
| QB5 | | | QB6 | | | QB7 | | | QB8 | | |

FIG. 30

MR, MO (400dpi)

| | RB1 | | RB2 | | RB3 | | RB4 | |
|---|---|---|---|---|---|---|---|---|
| | 0 | 0 | 117 | 202 | 21 | 0 | 0 | 0 |
| | 0 | 0 | 39 | 209 | 92 | 0 | 0 | 0 |
| | 0 | 0 | 0 | 92 | 209 | 39 | 0 | 0 |
| | 0 | 0 | 0 | 21 | 202 | 117 | 0 | 0 |
| | RB5 | | RB6 | | RB7 | | RB8 | |

FIG. 31

EF (2 bits)

| 00 | 10 | 10 | 00 | 11 | 11 | 00 | 00 |
|---|---|---|---|---|---|---|---|
| 00 | 10 | 10 | 00 | 11 | 11 | 00 | 00 |
| 00 | 00 | 10 | 10 | 00 | 11 | 11 | 00 |
| 00 | 00 | 10 | 10 | 00 | 11 | 11 | 00 |

1 INCH/400

1 INCH/600

IMAGE PROCESSING APPARATUS

BACKGROUND OF THE INVENTION

1. Field of the Invention

The present invention relates to an image processing apparatus for processing input bit map image data in order to output an input bit map image from an image output apparatus such as a printing apparatus.

2. Description of the Related Art

As bit map printers which print out a bit map image of a binary digital image, in recent years, laser beam printers utilizing an electrophotography (xerography) technique have been widely used. In most of such bit map printers, input bit map image data is processed so that jags in an oblique line portion or a curve portion of characters, graphics, and the like of an input image are reduced, and the oblique line portion and the curve portion are output in a smooth form.

Specifically, in the processing, methods of increasing the resolution of an input bit map image which are disclosed in U.S. Pat. No. 4,437,122 and Japanese Patent Unexamined Publication No. Hei 2-62260 are used.

In the method disclosed in U.S. Pat. No. 4,437,122, input bit map image data is segmented into blocks of binary image data for a pixel block of 3×3 pixels, and the center pixel of the pixel block is divided into 3×3 minute pixels. The blocks of binary image data are subjected to pattern matching so that values of the binary image data for the respective divided minute pixels are determined. In this way, the resolution of the input bit map image is increased to be nine times, thereby reducing jags in an oblique line portion.

In the method disclosed in Japanese Patent Unexamined Publication No. Hei 2-62260, input bit map image data having a resolution of 300 dpi (dot per inch) is converted into bit map image data having a resolution of 600 dpi, by performing simple magnification in a main scanning direction, and linear interpolation in a subscanning direction. In the linear interpolation, logical operation is conducted on binary image data of a total of 14 pixels in two adjacent lines which have been subjected to simple magnification.

If a printer system is assumed to have only a function as a bit map printer which prints out a bit map image, jags can be reduced by increasing the resolution of the input bit map image as described above.

However, printer systems are recently proposed to have multiple functions, i.e., to have a function as a bit map printer and also a function as a digital copy machine, or to additionally have a function as a facsimile apparatus. If a printer system is assumed to have the function as a bit map printer and the function as a digital copy machine, there arises a problem as described below in the case where the output resolution of the printing apparatus serving as the outputting unit is increased to a high level, for example, 600 dpi or more.

In an image output apparatus (image recording apparatus) serving as the outputting unit of a digital copy machine, an image data outputting unit 10 shown in FIG. 35 which is in the preceding stage operates in the following manner. Input image data which is obtained by reading an original by an image input apparatus (image reading apparatus) is processed by an image processing apparatus, thereby obtaining, for example, 8-bit multivalue image data CP. The 8-bit multivalue image data CP is converted into an analog signal by a D/A converter 11, so as to obtain an output image signal AO shown in FIG. 36. A comparator 12 compares the output image signal AO with a triangular wave Sa which is output from a triangular wave generating circuit 13 and has a period of one pixel as shown in FIG. 36. As a result, as shown in FIG. 36, a record control signal LC is obtained which is at a high level in a time period when the level of the output image signal AO exceeds that of the triangular wave Sa, and which is at a low level in a time period when the level of the output image signal AO is equal to or lower than that of the triangular wave Sa.

A printer unit which is in the stage subsequent to the image data outputting unit 10 is a laser beam printer of the so-called image lighting type in which, for example, a toner adheres to a portion on a photosensitive body which portion is irradiated with a recording laser beam, and the toner image is then transferred to a sheet to form a black image. The recording laser is turned on in the high-level period of the record control signal LC from the image data outputting unit 10, and turned OFF in the low-level period of the record control signal LC, so that a black image is formed in the output image as shown by hatched portions of FIG. 36.

In this case, according to the value of the multivalue image data CP, i.e., the level of the output image signal AO, the time width of the on-period of the record control signal LC is varied and the width of the black image in the output image is changed, whereby the gradation can be represented. This allows the gradation of intermediate tone levels in a photographic image, and the like to be reproduced.

If the output resolution of the image output apparatus is set to be high, e.g., 600 dpi or more, however, the frequency of the triangular wave Sa in the image data outputting unit 10 must be increased. Therefore, it is difficult to set the triangular wave Sa so as to have good linearity. Moreover, the width of the adhering toner is difficult to minutely control in the printing apparatus. As a result, the gradation such as intermediate tone levels is difficult to stably and well represent.

Accordingly, in a printer system having the function as a bit map printer and the function as a digital copy machine, it is necessary to suppress the output resolution of the printing apparatus or the image output apparatus serving as the outputting unit to be, e.g., about 600 dpi or less, in order to stably and well represent the gradation such as intermediate tone levels in a copy mode. In the above-described conventional method, therefore, it is impossible to increase the resolution of an input bit map image to a high resolution, e.g., 600 dpi or more in order to reduce jags in an oblique line portion and a curve portion in characters, graphics, and the like in a bit map image output mode.

SUMMARY OF THE INVENTION

The present invention has been made in view of the above, and an object of the invention is to provide an image processing apparatus which is capable of reducing jags in an oblique line portion and an curve portion in characters, graphics, and the like so that the oblique line portion and the curve portion can be output in a smooth form even in a case where the resolution of an input bit map image cannot be set to be a higher one because the output resolution of the image output apparatus is suppressed to a certain degree or less in consideration of the above-described facts, and rather the resolution of the input bit map image is lowered in accordance with the output resolution of the image output apparatus.

To solve the foregoing problems, according to the present invention, there is provided an image processing apparatus, comprising: an image data converting unit for converting input bit map image data BM having a resolution which is different from an output resolution of an image output apparatus 300, into multivalue image data MR having a resolution which is equal to the output resolution of the image output apparatus; an edge direction detecting unit for detecting an edge direction of the multivalue image data from the image data converting unit; and an image data outputting unit for outputting the multivalue image data from the image data converting unit based on an edge direction detection signal from the edge direction detecting unit.

The image data converting unit may comprise: a binary-to-multivalue converting unit for converting the input bit map image data into multivalue image data having a resolution which is equal to the resolution of the input bit map image data; and a resolution converting unit for converting the multivalue image data from the binary-to-multivalue converting unit into multivalue image data having a resolution which is equal to the output resolution of the image output apparatus.

The image data outputting unit utilizes, in order to output the multivalue image data MR from the image data converting unit, a reference wave in which at least a tilt direction is changed in accordance with the edge direction detection signal from the edge direction detecting unit.

The reference wave may be a triangular wave.

A description is given of a case where an image processing apparatus for white and black images is used, an output resolution of the image output apparatus 300 is set to be 400 dpi, and the input bit map image data BM having a resolution of 600 dpi is converted into 8-bit multivalue image data MR having a resolution of 400 dpi. It is assumed that the value "0" of the input bit map image data BM represents "white", and the value "1" represents "black". It is also assumed that 8-bit multivalue image data MI, MR, and MO are quantized in such a manner that the value "0" represents "white", and the value "255" represents "black", i.e., in such a manner that a larger value represents a higher density.

For the sake of convenience, it is assumed that, in the input bit map image data BM having a resolution of 600 dpi, binary image data of 14×8 pixels have specific values. In the image processing apparatus of the invention having the above-described configuration, the binary-to-multivalue converting unit converts a certain portion of 12×6 pixels among the input bit map image data having 14×8 pixels, into 8-bit multivalue image data having a resolution of 600 dpi, which forms specific data values.

In the resolution converting unit, the 8-bit multivalue image data having a resolution of 600 dpi for the 12×6 pixels is converted into 8-bit multivalue image data which has a resolution of 400 dpi for 8×4 pixels and has specific data values.

In the edge direction detecting unit, an edge direction is detected for each of 8×4 pixels of the multivalue image data, so that a 2-bit edge direction detection signal having specific contents is obtained. In the edge direction detection signal, "00" indicates "no edge", "10" indicates that the edge direction is "right", and "11" indicates that the edge direction is "left". The edge direction detecting unit produces also multivalue image data which is synchronized with the edge direction detection signal and has the same contents as those of the multivalue image data from the resolution converting unit.

In the image data outputting unit, the 8-bit multivalue image data having a resolution of 400 dpi from the edge direction detecting unit is converted into an analog signal, so as to obtain an output image signal. The output image signal is compared with a reference wave in which the tilt direction is changed depending on the edge direction, i.e., "right" or "left" indicated by the edge direction detection signal from the edge direction detecting unit, so that a record control signal is obtained.

With respect to the center portion of 4×4 pixels of the 8×4 pixel image for the multivalue image data, the recording laser of a printer unit is turned on in certain portions, so as to from an output image in which two curves are outlines.

By contrast, in the case where the input bit map image data having a resolution of 600 dpi is directly supplied to the printer unit, for the center portion 2 of 6×6 pixels of the 14×8 pixel image, the recording laser of the printer unit is turned on in certain portions, so as to form an output image in which two curves are outlines.

As described above, according to the image processing apparatus of the invention, even if the output resolution is lowered to be, for example, 400 dpi, the quality of an output image is not degraded, or rather jags in an oblique line portion and a curve portion in characters, graphics, and the like can be reduced, as compared with the case where an input bit map image having a resolution of, for example, 600 dpi is directly output. As a result, the oblique line portion and the curve portion can be output in a smooth form.

The above and other objects and features of the present invention will be more apparent from the following description taken in conjunction with the accompanying drawings.

BRIEF DESCRIPTION OF THE DRAWINGS

FIG. 5 is a diagram used for illustrating binary-to-multivalue conversion;

FIG. 6 is a diagram used for illustrating binary-to-multivalue conversion;

FIG. 7 is a diagram used for illustrating binary-to-multivalue conversion;

FIG. 8 is a diagram used for illustrating binary-to-multivalue conversion;

FIG. 9 is a diagram used for illustrating binary-to-multivalue conversion;

FIG. 10 is a diagram used for illustrating binary-to-multivalue conversion;

FIG. 18 is a diagram used for illustrating edge direction detection;

FIG. 19 is a diagram used for illustrating edge direction detection;

FIG. 20 is a diagram used for illustrating edge direction detection;

FIG. 23 is a diagram used for illustrating image data output;

FIG. 27 is a diagram used for illustrating image data output;

FIG. 28 is a diagram showing an assumed example of input bit map image data;

FIG. 29 is a diagram showing an assumed example of multivalue image data having a resolution which is equal to that of the input bit map image data;

FIG. 30 is a diagram showing an assumed example of multivalue image data having a resolution which is equal to the output resolution of the image output apparatus;

FIG. 31 is a diagram showing an assumed example of an edge direction detection flag;

DETAILED DESCRIPTION OF THE PREFERRED EMBODIMENTS

A specific embodiment of the invention will be described by way of an exemplary case where, in a printer system for white and black images having a function as a bit map printer and a function as a digital copy machine, the output resolution of an image output apparatus is 400 dpi, and, in a bit map image output mode, input bit map image data having a resolution of 600 dpi is converted into 8-bit multivalue image data having a resolution of 400 dpi. In the following embodiment, the relationship between values of the input bit map image data and the multivalue image data and "white" and "black" images is the same as that described above.

Figure 1:
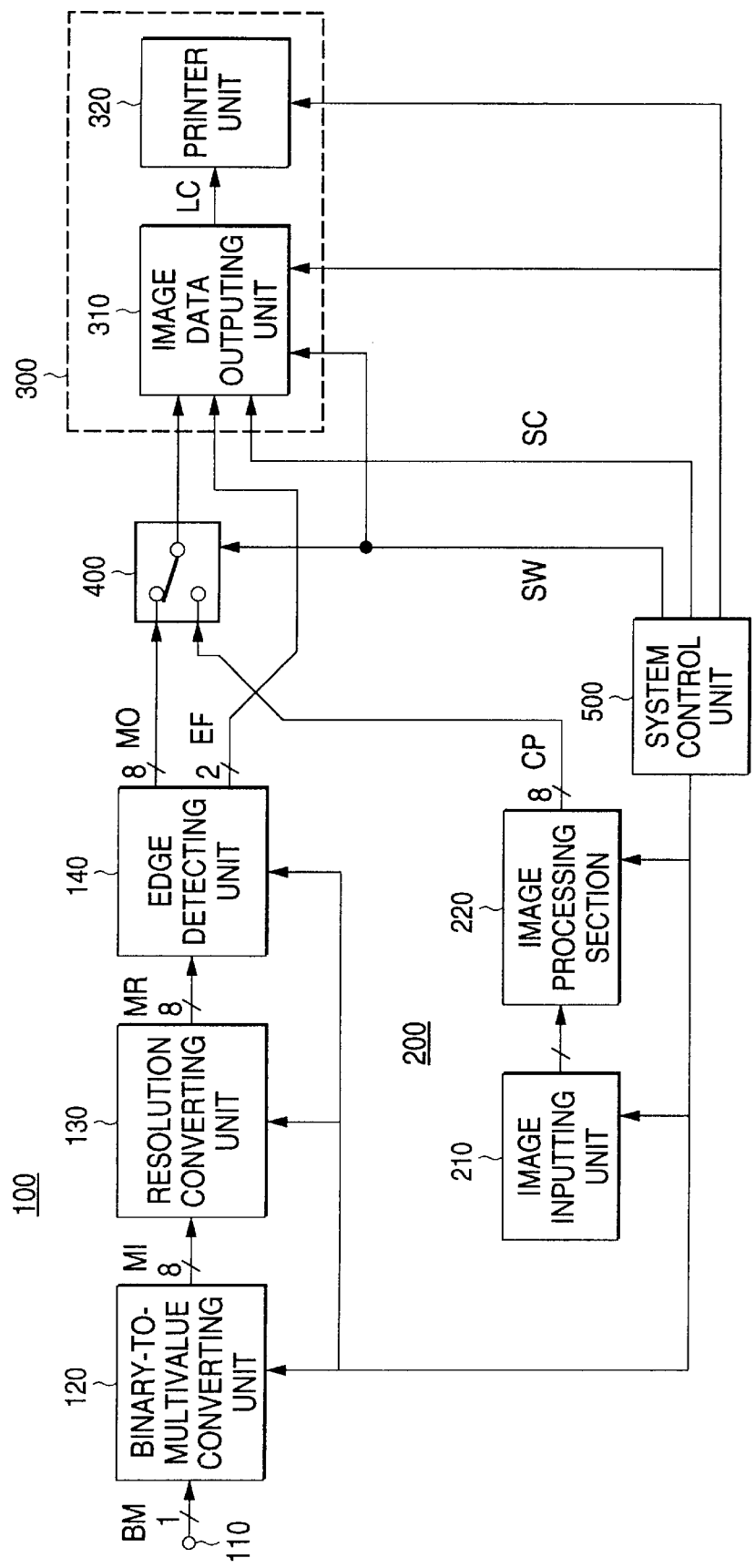
FIG. 1 is a block diagram showing an example of a printer system utilizing an example of the image processing apparatus of the invention.

FIG. 1 shows an example of the above-described printer system using an example of the image processing apparatus of the invention. The printer system comprises a bit map image processing system 100, a copy-machine image input processing system 200, an image output apparatus 300 which is commonly used for the process of outputting a bit map image and the that copying of an original, a switch 400 for switching image data between a bit map image output mode and a copy mode, and a system control unit 500 for controlling portions of the printer system.

The bit map image processing system 100, and an image data outputting unit 310 of the image output apparatus 300 constitute an example of the image processing apparatus of the invention, and the system and the whole of the image output apparatus 300 constitute the bit map printer. Input bit map image data BM which has a resolution of 600 dpi and which is input to an input terminal 110 from a computer or the like is converted into 8-bit multivalue image data MI having a resolution of 600 dpi by a binary-to-multivalue converting unit 120. The multivalue image data MI is converted into 8-bit multivalue image data MR having a resolution of 400 dpi by a resolution converting unit 130. An edge direction of the multivalue image data MR is detected by an edge direction detecting unit 140, so that a 2-bit edge direction detection flag EF is obtained from the edge direction detecting unit 140. Also, multivalue image data MO which is synchronized with the edge direction detection flag EF and has the same contents as those of the multivalue image data MR is obtained from the edge direction detecting unit 140.

The copy-machine image input processing system 200 and the whole of the image output apparatus 300 constitute the digital copy machine. An original is read by an image inputting unit 210 with a resolution of 400 dpi, so that input image data is obtained from the image inputting unit 210. The input image data is processed by an image processing section 220, and 8-bit multivalue image data CP having a resolution of 400 dpi is obtained from the image processing section 220.

The image output apparatus 300 comprises the image data outputting unit 310 and the printer unit 320. In the image data outputting unit 310, the multivalue image data MO from the edge direction detecting unit 140 or the multivalue image data CP from the image processing section 220 is converted into an analog signal, so as to obtain an output image signal. The output image signal is compared with a reference wave which is obtained based on the edge direction detection flag EF from the edge direction detecting unit 140 or a switching signal SC from the system control unit 500, thereby obtaining a record control signal LC. The record control signal LC is supplied to the printer unit 320. The printer unit 320 is, for example, a laser beam printer of the image lighting type utilizing the electrophotography technique.

Figure 2:
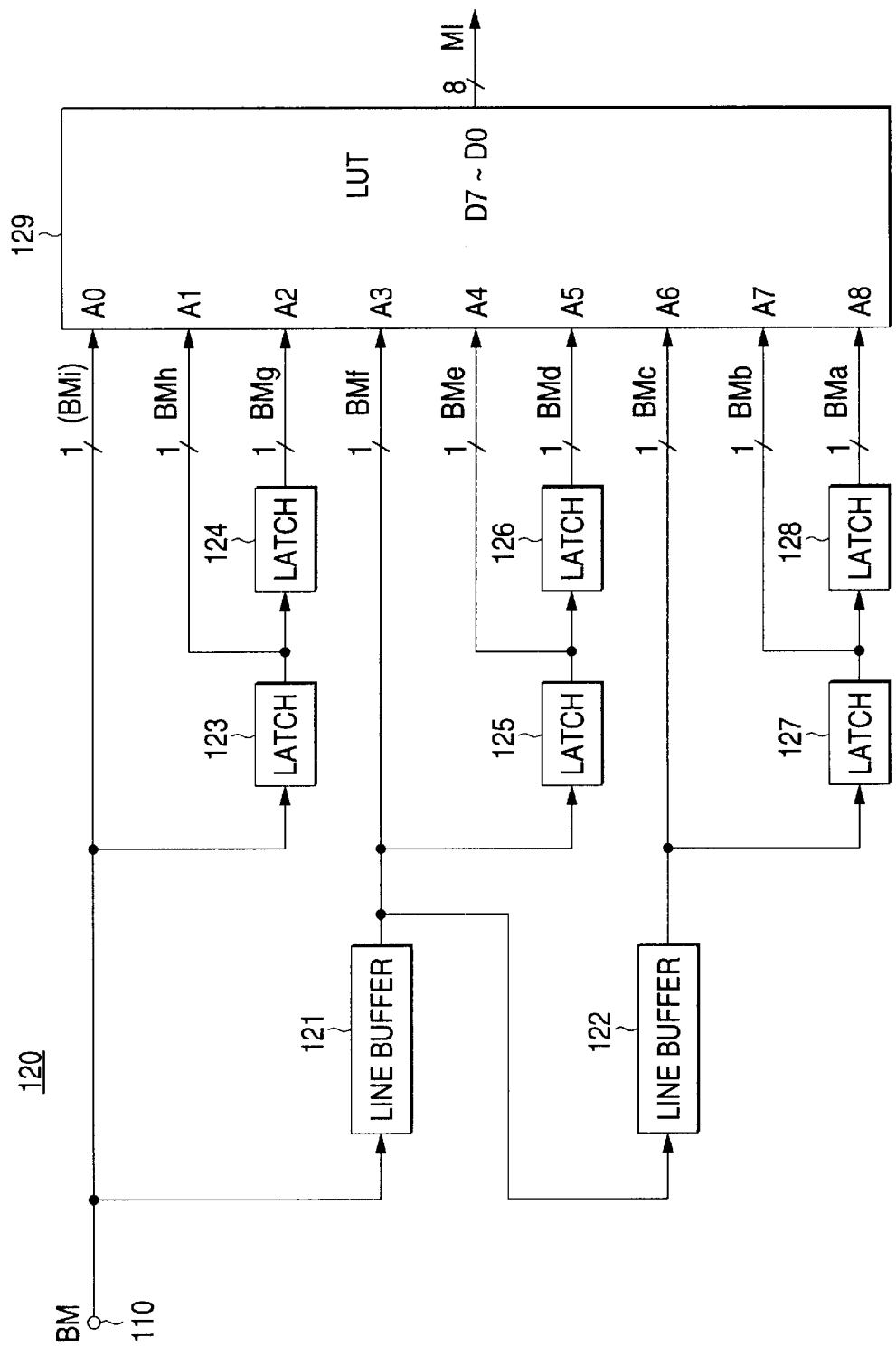
FIG. 2 is a block diagram showing an example of a binary-to-multivalue converting unit.

FIG. 2 shows an example of the binary-to-multivalue converting unit 120. The input bit map image data BM having a resolution of 600 dpi from the input terminal 110 is segmented into a data block PD by line buffers (line memories) 121 and 122 for delaying data by one line period, and latch circuits 123 to 128 for delaying data by one pixel period. The data block PD consists of 9 pieces of binary image data BMa–BMi shown in the right portion of FIG. 3 for a pixel block PB of the input image consisting of 3×3 pixels Pa to Pi having an interested pixel Pe as a center as shown in the left portion of FIG. 3. The binary image data BMa to BMi are supplied to address terminals A8 to A0 of a converting look up table (hereinafter referred to as "LUT") 129 which is constituted by a ROM or a RAM of $2^9 \times 8$ bits.

In the LUT 129, 8-bit multivalue image data MI are previously written at a total of $2^9 = 512$ addresses. The multivalue image data have values depending on the respective addresses, i.e., values depending on the pattern contents of the data block PD which consists of the binary image data pieces BMa to BMi supplied to the address terminals A8 to A0. When the binary image data BMa to BMi are supplied to the address terminals A8 to A0, the 8-bit multivalue image data MI is read from output terminals D7 to D0.

Figures 3, 4:
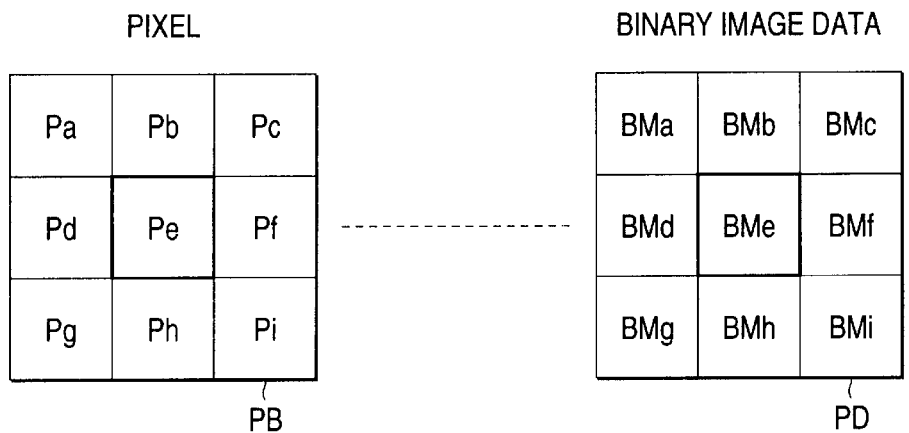
FIG. 3 is a diagram used for illustrating binary-to-multivalue conversion.
FIG. 4 is a diagram used for illustrating binary-to-multivalue conversion.

In the example, as shown in FIG. 4 and as described below, the value of the 8-bit multivalue image data MI is selected to be one of 255, 207, 159, 96, 48, and 0 in decimal notation, depending on the pattern contents of the data block PD consisting of the binary image data BMa to BMi. In the following description, values of multivalue image data are represented in decimal notation.

Figure 5:
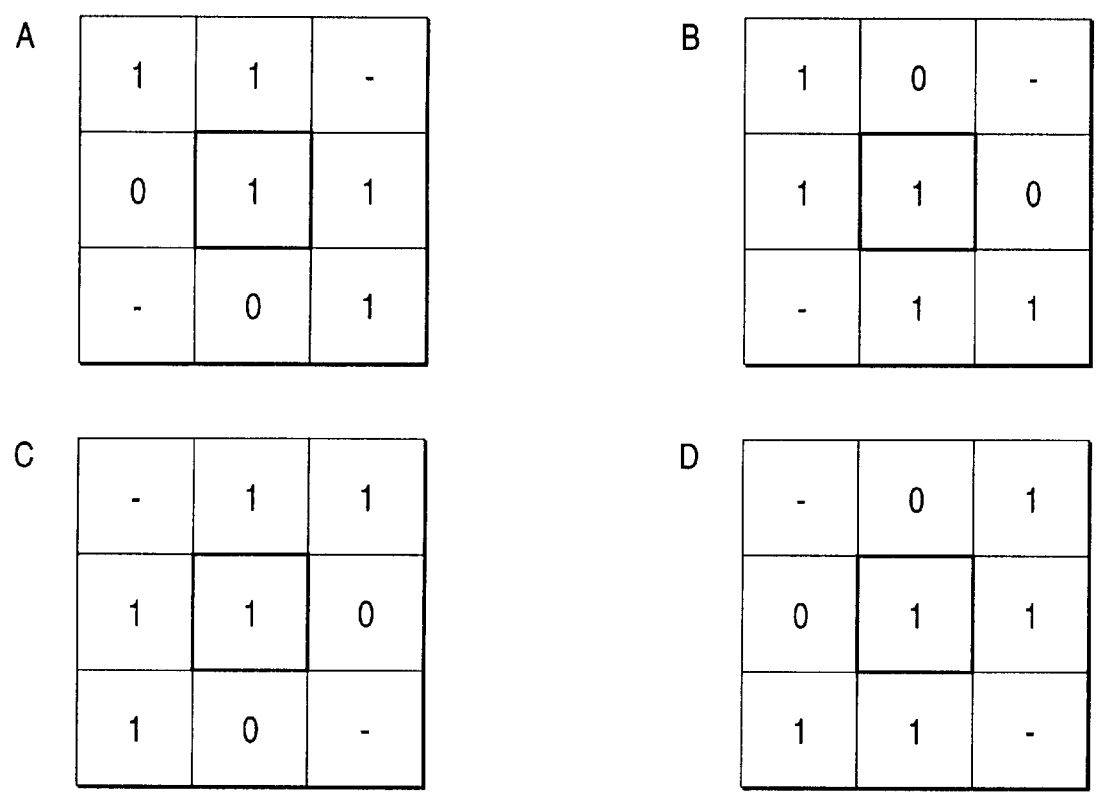

If the data block PD has the pattern contents illustrated in A, B, C, or D of FIG. 5, a value of "207" is output as the multivalue image data MI. In FIGS. 5 to 10, a pixel which is indicated by "−" can have any one of binary image data "1" and "0".

When the pattern contents of the data block PD satisfy all the following conditions (1) to (3), the output multivalue image data MI has a value of "207". (1) In the pixel block PB, three successive pixels in one diagonal direction including the interested pixel Pe have the binary image data of "1". (2) Two successive pixels in the same diagonal direction excluding the interested pixel Pe have the binary image data of "1". (3) Other two successive pixels in the same diagonal direction excluding the interested pixel Pe have the binary image data of "0".

If the data block PD has the pattern contents illustrated in A1, A2, B1, B2, C1, C2, D1, or D2 of FIG. 6, a value of "159" is output as the multivalue image data MI. A1 and A2 of FIG. 6 correspond to A of FIG. 5, B1 and B2 of FIG. 6 to B of FIG. 5, C1 and C2 of FIG. 6 to C of FIG. 5, and D1 and D2 of FIG. 6 to D of FIG. 5. In FIG. 6, the binary image data of one end pixel of three successive pixels in one diagonal direction which include the interested pixel Pe and all of which have the binary image data of "1" in FIG. 5 is replaced with "0".

Figure 7:
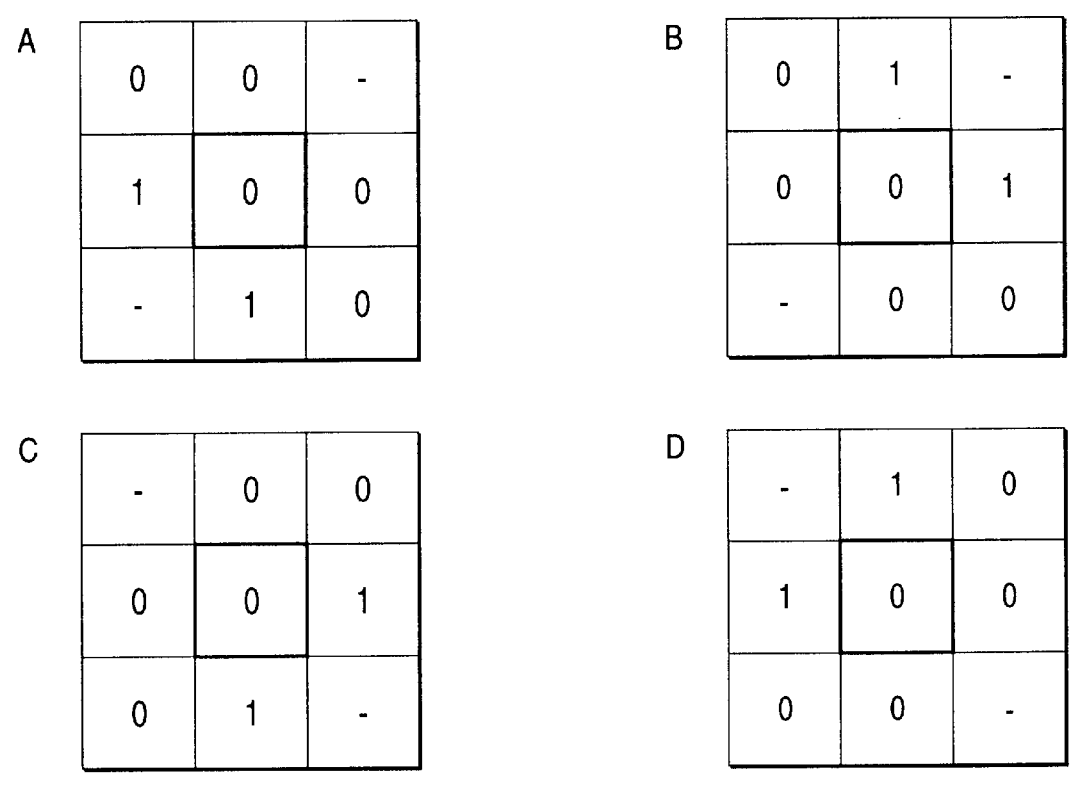

If the data block PD has the pattern contents illustrated in A, B, C, or D of FIG. 7, a value of "48" is output as the multivalue image data MI. A, B, C, and D of FIG. 7 correspond to A, B, C, and D of FIG. 5, respectively. In FIG. 7, the values of all the binary image data of seven pixels excluding the pixels which are indicated by "−" in FIG. 5 are replaced with the other values.

If the data block PD has the pattern contents illustrated in A1, A2, B1, B2, C1, C2, D1, or D2 of FIG. 8, a value of "96" is output as the multivalue image data MI. A1 and A2 of FIG. 8 correspond to A of FIG. 7, B1 and B2 of FIG. 8 to B of FIG. 7, C1 and C2 of FIG. 8 to C of FIG. 7, and D1 and D2 of FIG. 8 correspond to D of FIG. 7. In FIG. 8, the binary image data of one end pixel of three successive pixels in one diagonal direction which include the interested pixel Pe and all of which have the binary image data of "0" in FIG. 7 is replaced with "1".

In the case where the data block PD has pattern contents other than those shown in FIGS. 5 to 8, the multivalue image data MI has a value in accordance with the value of the binary image data BMe of the interested pixel Pe. Namely, when the binary image data BMe is "1", a value of "255" is output as the multivalue image data MI, and, when the binary image data BMe is "0", a value of "0" is output as the multivalue image data MI.

Figure 9:
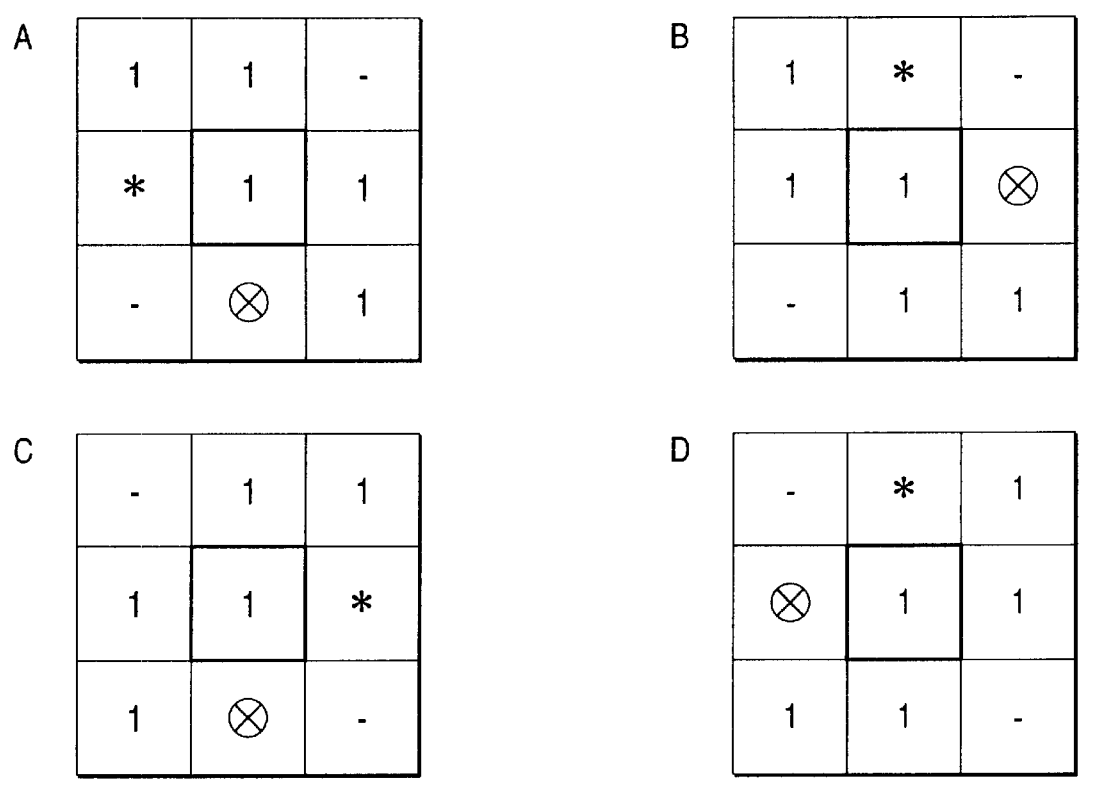

In other words, in the case where at least one of the pixels which are indicated by "*" or "ⓧ" in FIG. 9 has the binary image data of "1" (when both the pixels have the binary image data of "0", the multivalue image data MI has the value of "207", as shown in FIG. 5), when the data block PD has the pattern contents illustrated in A, B, C, or D of FIG. 9, the output multivalue image data MI has the value of "255".

Figure 10:
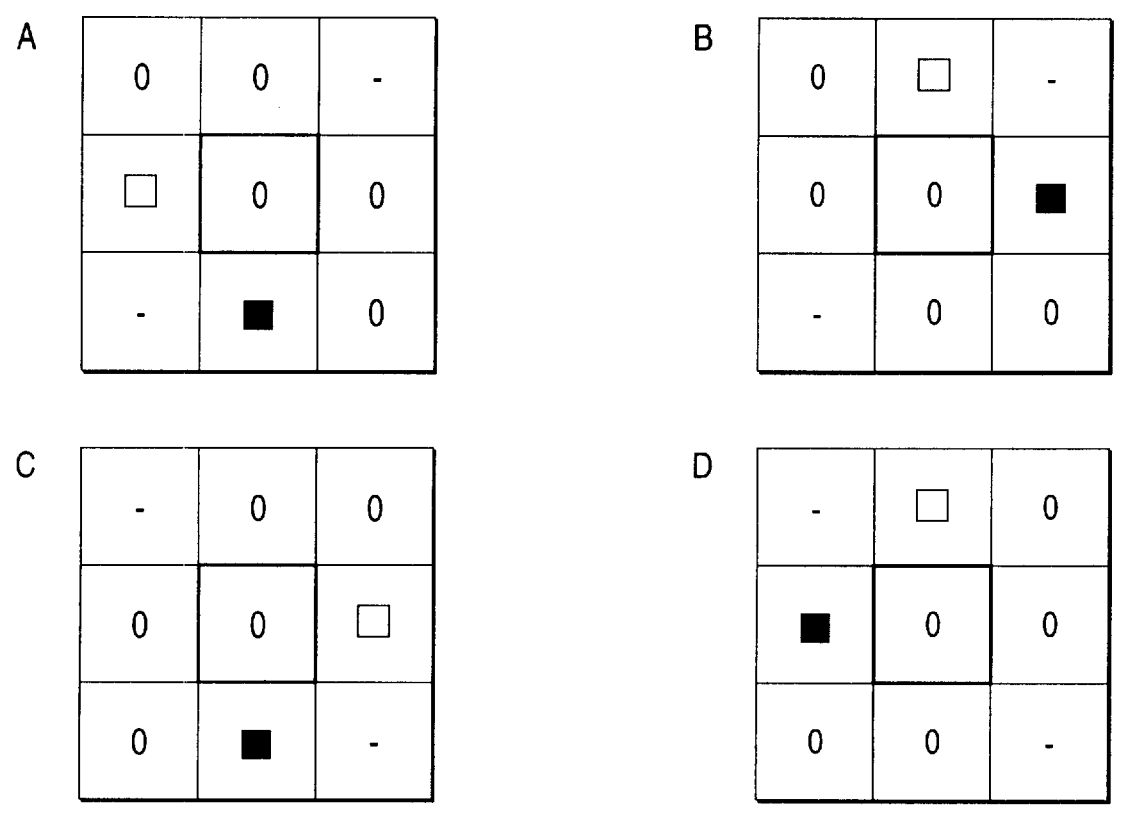

In the case where at least one of the pixels which are indicated by "□" or "■" in FIG. 10 has the binary image data of "0" (when both the pixels have the binary image data of "1", the multivalue image data MI has the value of "48" as shown in FIG. 7), when the data block has the pattern contents illustrated in A, B, C, or D of FIG. 10, the output multivalue image data MI has the value of "0".

In this way, in the binary-to-multivalue converting unit 120, the input bit map image data BM which is binary image data is converted into the multivalue image data MI. This cooperates with the detection (which will be described later) of the edge direction of the multivalue image data MR from the resolution converting unit 130 in the edge direction detecting unit 140, and also with the production (which will be described later) of the record control signal LC in the image data outputting unit 310 wherein the output image signal AO which is obtained by converting the multivalue image data MO from the edge direction detecting unit 140 into an analog signal is compared with the reference wave Sr which has a variable phase and period in accordance with the contents of the edge direction detection flag EF from the edge direction detecting unit 140. As a result, jags in an oblique line portion and a curve portion in characters, graphics, and the like in the input image are reduced, so that the oblique line portion and the curve portion are output in a smooth form.

For the sake of convenience, the above-described binary-to-multivalue conversion in the binary-to-multivalue converting unit 120 will be described by way of an exemplary case where the binary image data of the input bit map image data BM having a resolution of 600 dpi have the specifically illustrated values with respect to 14 8 pixels as shown in FIG. 28. When the multivalue image data for the upper left corner pixel P1 in the area enclosed by broken lines 1 is to be obtained, the binary image data for 9 pixels in the pixel block PB1 with the pixel P1 as the center are referred to. As apparent from this fact, for the 12×6 pixels in the area enclosed by the broken lines 1, 8-bit multivalue image data MI having specific data values as shown in FIG. 29 is output. It is a matter of course that the resolution of the multivalue image data MI is equal to that of the input bit map image data BM.

In general, known resolution converting methods include the nearest neighbor method, the bilinear method, the 3-dimensional convolution interpolation method, the projection method, etc.

In the bilinear method, the 3-dimensional convolution interpolation method, and the projection method, when the resolution is to be lowered, image data for one pixel in an image after conversion is obtained from image data for at least four pixels in an image before conversion. As compared with the nearest neighbor method in which the image data for one pixel in an image before conversion is directly used as the image data for one pixel in an image after conversion, therefore, a good image quality can be attained as the image after conversion.

In the bilinear method, image data for one pixel in an image after conversion is calculated from image data for four pixels in an image before conversion, so that the method can be implemented by a relatively small calculation scale. By contrast, in the 3-dimensional convolution interpolation method, image data for one pixel in an image after conversion is calculated from image data for 16 pixels in an image before conversion, so that the method requires a relatively large calculation scale. In the projection method, the number of pixels to be referred to in the image before conversion can be varied depending on a lowered magnification of resolution. However, all the pixels in the image before conversion are referred to in any magnification case as a whole, so that moire due to the lowering of resolution hardly occurs, and thin lines cannot be dropped out.

The resolution converting method itself is not relevant to the invention, and the invention can be implemented by any method. In the following example, the projection method is used in the resolution conversion in the resolution converting unit 130, because of the above-mentioned advantages of the projection method.

Figure 11:
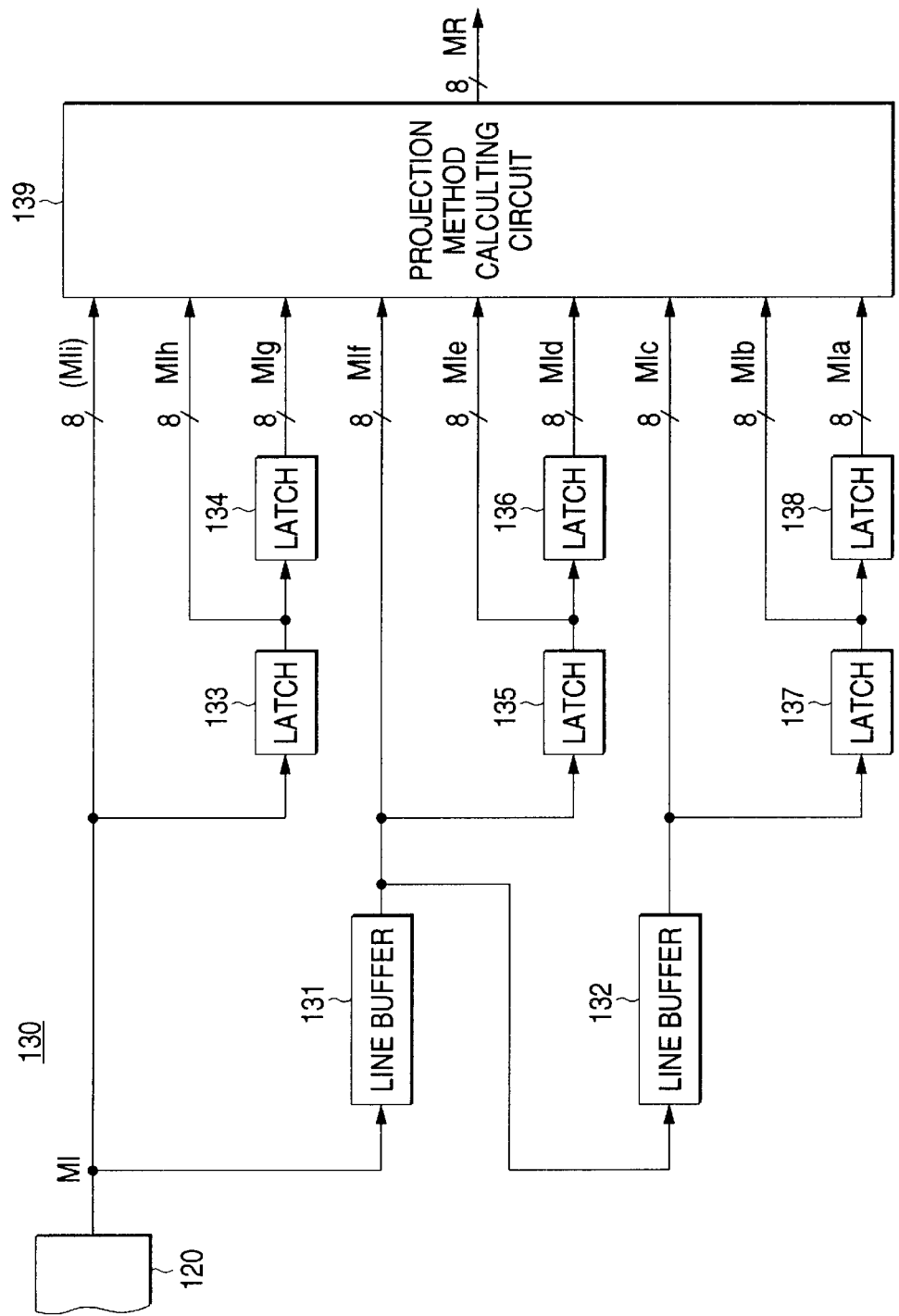
FIG. 11 is a block diagram showing an example of a resolution converting unit.

FIG. 11 shows an example of the resolution converting unit 130. By line buffers 131 and 132 for delaying data by one line period and latch circuits 133 to 138 for delaying data by one pixel period, the 8-bit multivalue image data MI having a resolution of 600 dpi from the binary-to-multivalue converting unit 120 is segmented into a data block QD having nine multivalue image data MIa to MIi as shown in an upper right portion of FIG. 12, for a pixel block QB including 3×3 pixels Qa to Qi as shown in an upper left portion of FIG. 12 in an image before conversion. The multivalue image data MIa to MIi are supplied to a projection method calculating circuit 139.

Figures 12, 13:
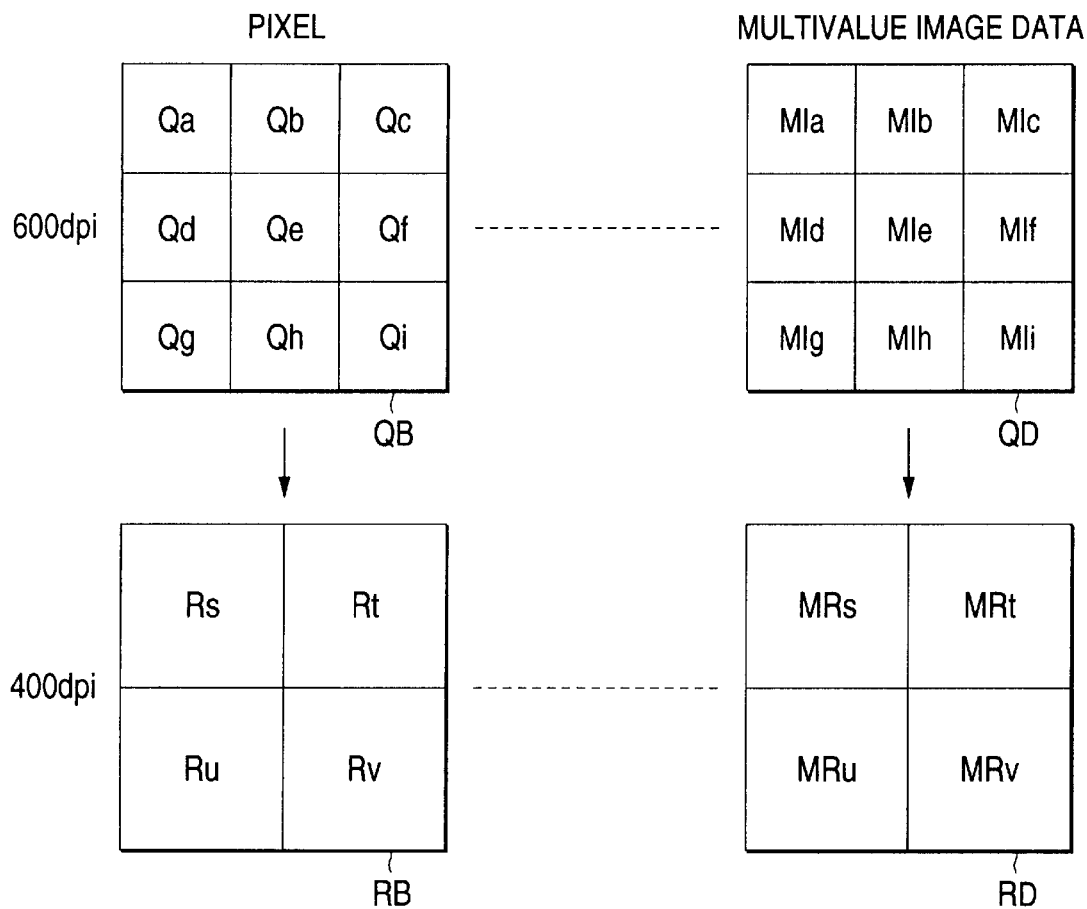
FIG. 12 is a diagram used for illustrating resolution conversion.
FIG. 13 is a diagram used for illustrating resolution conversion.

In the case where the 8-bit multivalue image data MI having a resolution of 600 dpi is to be converted into 8-bit multivalue image data MR having a resolution of 400 dpi, in accordance with operation expressions shown in FIG. 13, the projection method calculating circuit 139 calculates a data block RD consisting of four multivalue image data MRs to MRv as shown in a lower right portion of FIG. 12, for a pixel block RB consisting of 2×2 pixels Rs to Rv as shown in a lower left portion of FIG. 12, from the multivalue image data MIa to MIi.

For the sake of convenience, the above-described resolution conversion in the resolution converting unit 130 will be described by way of an exemplary case where the 8-bit multivalue image data MI having a resolution of 600 dpi before conversion have the specifically illustrated values with respect to 12×6 pixels shown in FIG. 29, respectively. From 9 multivalue image data for each of pixel blocks QB1 to QB8 each consisting of 3×3 pixels, four multivalue image data for each of pixel blocks RB1 to RB8 each consisting of 2×2 pixels in an image including a total of 8×4 pixels and having a resolution of 400 dpi after conversion are calculated so as to have the specifically illustrated values, as shown in FIG. 30.

Figure 14:
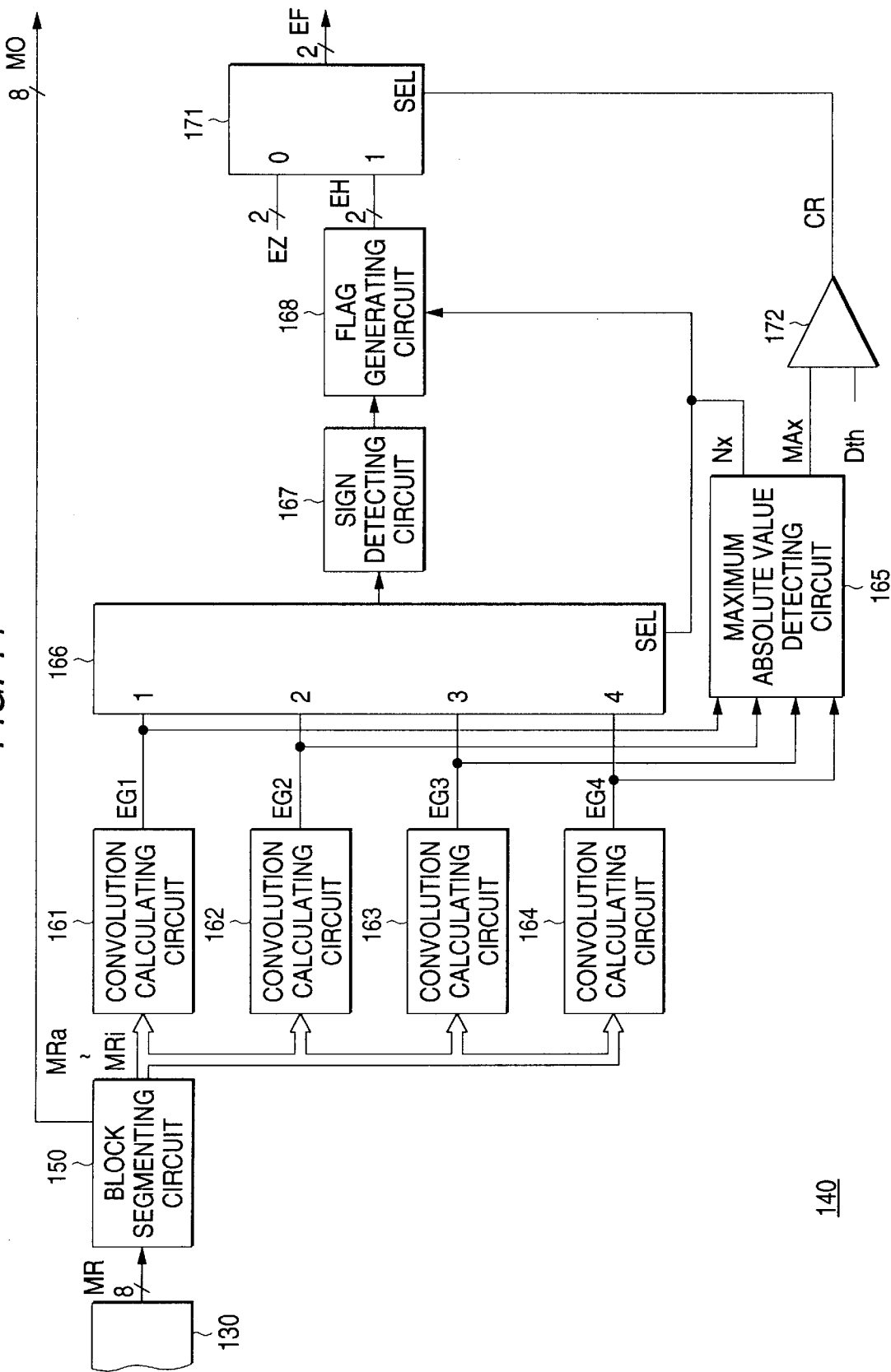
FIG. 14 is a block diagram showing an example of an edge direction detecting unit.
Figure 15:
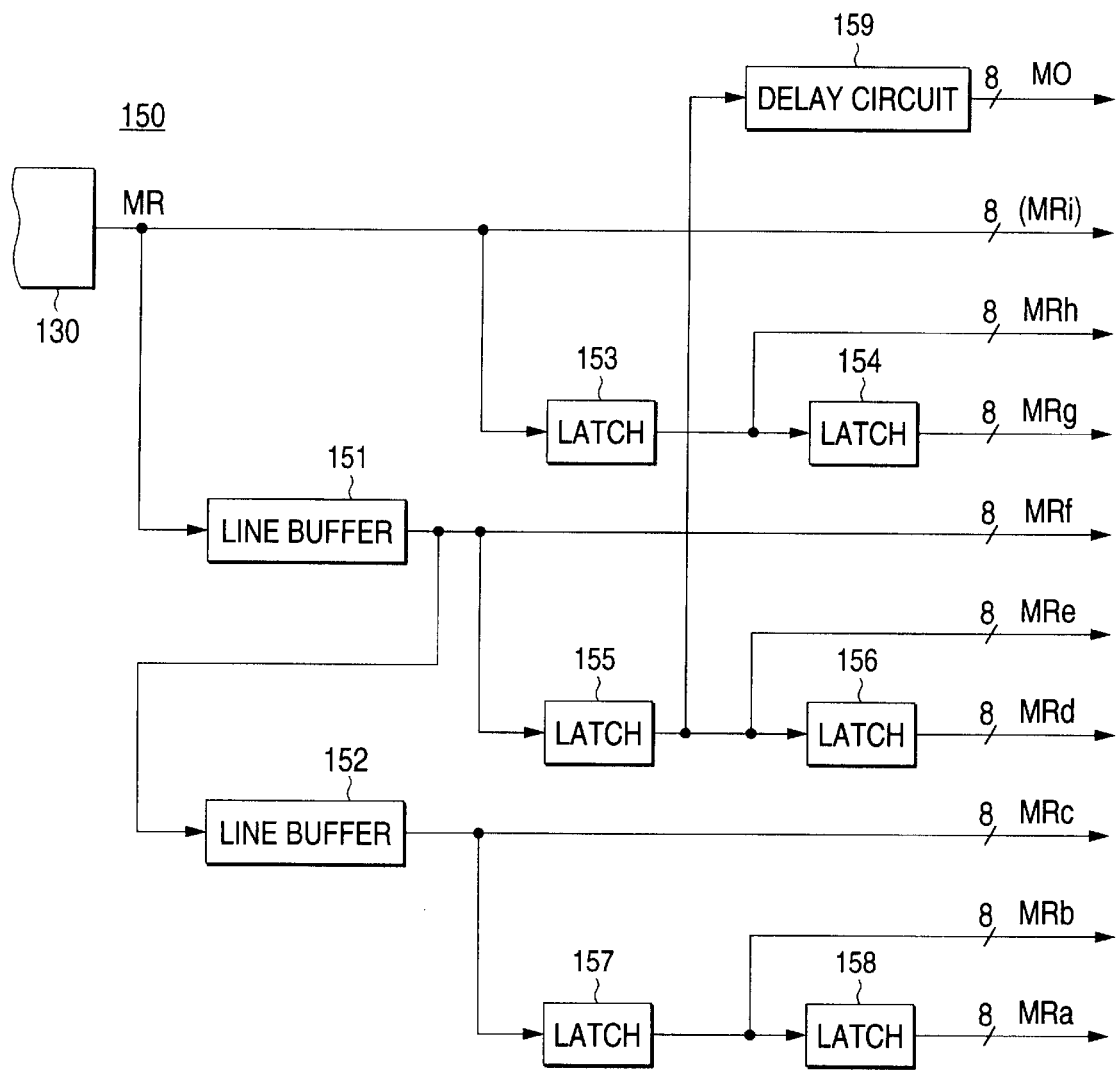
FIG. 15 is a block diagram showing an example of a block segmenting circuit of the edge direction detecting unit.

FIG. 14 shows an example of the edge direction detecting unit 140. The 8-bit multivalue image data MR having a resolution of 400 dpi from the resolution converting unit 130 is supplied to a block segmenting circuit 150 which consists of line buffers 151 and 152 for delaying data by one line period, and latch circuits 153 to 158 for delaying data by one pixel period, as shown in FIG. 15. The 8-bit multivalue image data MR is segmented into a data block SD consisting of 9 multivalue image data MRa to MRi as shown in a right portion of FIG. 16, for a pixel block SB consisting of 3×3 pixels Ra to Ri having the interested pixel Re as a center as shown in a left portion of FIG. 16 in an image after resolution conversion.

As shown in FIG. 14, the multivalue image data MRa to MRi from the block segmenting circuit 150 are supplied to convolution calculating circuits 161 to 164 which conduct the convolution calculation on the multivalue image data MRa to MRi by using four kinds of coefficients which are different from each other.

Specifically, the convolution calculating circuit 161 detects an edge in the vertical direction of an image. The multivalue image data MRa to MRi are multiplied by coefficients which are shown in blocks in A of FIG. 7 and correspond to the data block SD shown in FIG. 16, respectively. Then, the sum of the multiplication results is obtained, and the sum is output as detected value data EG1.

Figures 16, 17:
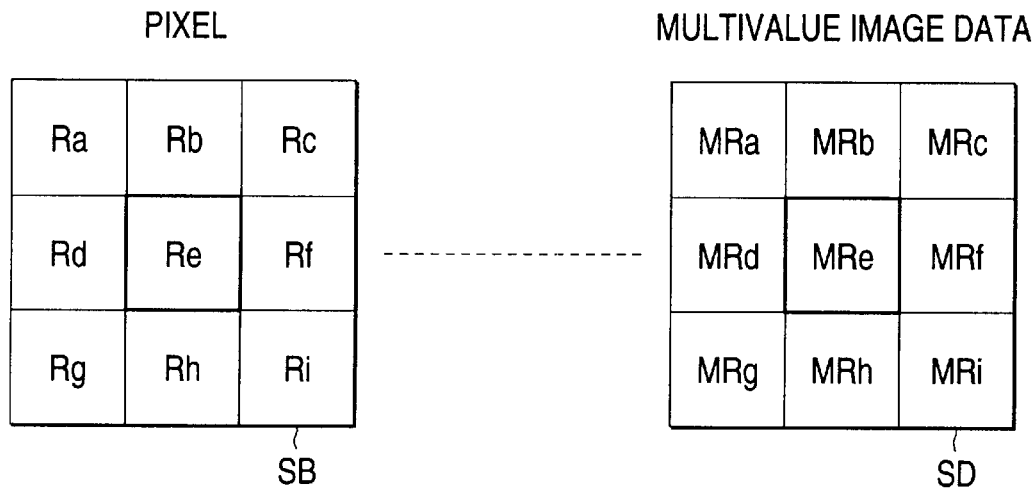
FIG. 16 is a diagram used for illustrating edge direction detection.
FIG. 17 is a diagram used for illustrating edge direction detection.

The convolution calculating circuit 162 detects an edge in the horizontal direction of the image, and utilizes coefficients shown in B of FIG. 17. The convolution calculating circuits 163 and 164 detect edges in one diagonal direction and in another diagonal direction of the image, respectively, and utilize coefficients shown in C and D of FIG. 17, respectively.

When the multivalue image data MRa to MRi of the data block SD have the values shown in A1 of FIG. 18, therefore, the detected value data EGI from the convolution calculating circuit 161 has a value of "+765", the detected value data EG2 from the convolution calculating circuit 162 has a value of "0", and the detected value data EG3 and EG4 from the convolution calculating circuits 163 and 164 have a value of "+510". When the multivalue image data MRa to MRi have the values shown in A2 of FIG. 18, the detected value data EG1, EG2, EG3, and EG4 have values of "−765", "0", "−510", and "−510", respectively.

When the multivalue image data MRa to MRi have the values shown in B1 of FIG. 18, the detected value data EG1, EG2, EG3, and EG4 have values of "0", "+765", "+510", and "+510", respectively. When the multivalue image data MRa to MRi have the values shown in B2 of FIG. 18, the detected value data EG1, EG2, EG3, and EG4 have values of "0", "−765", "−510", and "+510", respectively.

When the multivalue image data MRa to MRi have the values shown in C1 of FIG. 18, the detected value data EG1, EG2, EG3, and EG4 have values of "+510", "+510", "+765", and "0", respectively. When the multivalue image data MRa to MRi have the values shown in C2 of FIG. 18, the detected value data EG1, EG2, EG3, and EG4 have values of "−510", "−510", "−765", and "0", respectively.

When the multivalue image data pieces MRa to MRi have the values shown in D1 of FIG. 18, the detected value data EG1, EG2, EG3, and EG4 have values of "+510", "−510", "0", and "+765", respectively. When the multivalue image data pieces MRa to MRi have the values shown in D2 of FIG. 18, the detected value data EG1, EG2, EG3, and EG4 have values of "−510", "+510", "0", and "−765", respectively.

In the description, the edge direction is assumed in the following manner. If the density is lowered along the direction from the upper portion to the lower portion of the pixel block SB as shown in A1 of FIG. 18, it is assumed that the edge direction is "upward". If the density is raised along the direction from the upper portion to the lower portion of the pixel block SB as shown in A2 of FIG. 18, it is assumed that the edge direction is "downward". If the density is lowered along the direction from the left portion to the right portion of the pixel block SB as shown in B1 of FIG. 18, it is assumed that the edge direction is "leftward". If the density is raised along the direction from the left portion to the right portion of the pixel block SB as shown in B2 of FIG. 18, it is assumed that the edge direction is "rightward".

If the density is lowered along the direction from the upper left portion to the lower right portion of the pixel block SB as shown in C1 of FIG. 18, it is assumed that the edge direction is "leftward". If the density is raised along the direction from the upper left portion to the lower right portion of the pixel block SB as shown in C2 of FIG. 18, it is assumed that the edge direction is "rightward". If the density is lowered along the direction from the upper right portion to the lower left portion of the pixel block SB as shown in D1 of FIG. 18, it is assumed that the edge direction is "rightward". If the density is raised along the direction from the upper right portion to the lower left portion of the pixel block SB as shown in D2 of FIG. 19, it is assumed that the edge direction is "leftward".

As shown in FIG. 14, the detected value data EG1 to EG4 from the convolution calculating circuits 161 to 164 are supplied to a maximum absolute value detecting circuit 165 which detects the data having the maximum absolute value among the detected value data EG1 to EG4. The data Nx which indicates the number of the detected value data having the maximum absolute value, and the detected value data EG1 to EG4 from the convolution calculating circuits 161 to 164 are supplied to a selector 166. The data having the maximum absolute value among the detected value data EG1 to EG4 is taken out from the selector 166.

The detected value data having the maximum absolute value from the selector 166 is supplied to a sign detecting circuit 167 which detects the sign (plus/minus) of the detected value data. The detected output, and the data Nx from the maximum absolute value detecting circuit 165 are supplied to a flag generating circuit 168. The flag generating circuit 168 generates a 2-bit edge direction detection flag EH the contents of which are determined in accordance with the number of the detected value data having the maximum absolute value and the sign of the detected value data.

That is, the flag generating circuit 168 generates "01" as the 2-bit edge direction detection flag EH which indicates the edge direction of "upward" or "downward", when the above-described multivalue image data MRa to MRi of the data block SD have, for example, the values shown in A1 of FIG. 18 and the detected value data EG1 is the positive value of which the absolute value is the maximum, or when the multivalue image data MRa to MRi have, for example, the values shown in A2 of FIG. 18 and the detected value data EGI is the negative value of which the absolute value is the maximum, as shown in FIG. 19.

When the multivalue image data MRa to MRi have, for example, the values as shown in B1 of FIG. 18 and the detected value data EG2 is the positive value of which the absolute value is the maximum, "11" which indicates that the edge direction is "leftward" is generated. When the multivalue image data MRa to MRi have, for example, the values as shown in B2 of FIG. 18 and the detected value data EG2 is the negative value of which the absolute value is the maximum, "10" which indicates that the edge direction is "rightward" is generated.

When the multivalue image data MRa to MRi have, for example, the values as shown in C1 of FIG. 18 and the detected value data EG3 is the positive value of which the absolute value is the maximum, "11" which indicates that the edge direction is "leftward" is generated. When the multivalue image data MRa to MRi have, for example, the values as shown in C2 of FIG. 18 and the detected value data EG3 is the negative value of which the absolute value is the maximum, "10" which indicates that the edge direction is "rightward" is generated.

When the multivalue image data MRa to MRi have, for example, the values as shown in D1 of FIG. 18 and the detected value data EG4 is the positive value of which the absolute value is the maximum, "10" which indicates that the edge direction is "rightward" is generated. When the multivalue image data MRa to MRi have, for example, the values as shown in D2 of FIG. 18 and the detected value data EG4 is the negative value of which the absolute value is the maximum, "11" which indicates that the edge direction is "leftward" is generated.

In addition, as shown in FIG. 14, the edge direction detection flag EH from the flag generating circuit 168, and a flag EZ of "00" which indicates that there is no edge and which is fixedly generated in the edge direction detecting unit 140 are supplied to a selector 171. Data MAx indicative of the absolute value which has the maximum absolute value among the detected value data EG1 to EG4 from the maximum absolute value detecting circuit 165 is supplied to a comparator 172 which compares the data with data Dth having a reference value. In the case where the multivalue image data MR has 8 bits and the multivalue image data MR is segmented into a block of 3×3 pixels, the reference value indicated by the data Dth is set in the range of about 128 to 150.

The output signal CR of the comparator 172 is supplied to the selector 171. If the absolute value indicated by the data MAx is larger than the reference value indicated by the data Dth and the output signal CR is "1", the edge direction detection flag EH from the flag generating circuit 168 is directly taken out from the selector 171, as the final edge direction detection flag EF. If the absolute value indicated by the data MAx is equal to or smaller than the reference value indicated by the data Dth and the output signal CR is "0", the flag EZ of "00" indicating that there is no edge is taken out from the selector 171, as the final edge direction detection flag EF.

Accordingly, the 2-bit contents of the edge direction detection flag EF which is finally obtained in the edge direction detecting unit 140 indicate that there is no edge, that the edge direction is "upward" or "downward", that the edge direction is "rightward", or that the edge direction is "leftward", as shown in FIG. 20.

In the edge direction detecting unit 140, the multivalue image data MRe from a latch circuit 155 of the block segmenting circuit 150 shown in FIG. 15 is delayed by a delay circuit 159, so as to obtain 8-bit multivalue image data MO which has a resolution of 400 dpi and which is synchronized with the final edge direction detection flag EF obtained from the selector 171.

For the sake of convenience, the above-described detection of edge direction in the edge direction detecting unit 140 will be described by way of an example case where the data values of the 8-bit multivalue image data MR having a resolution of 400 dpi after resolution conversion have the specifically illustrated values with respect to 8×4 pixels as shown in FIG. 30. When the edge direction of each pixel is detected, multivalue image data of 9 pixels having the respective pixel as the center one is referred to. However, pixels of the multivalue image data of "0" are assumed to be present in a peripheral portion of the illustrated image of 8×4 pixels, so that the 2-bit edge direction detection flag EF having the specific contents shown in FIG. 31 is obtained for each of the illustrated 8×4 pixels.

The 8-bit multivalue image data MO having a resolution of 400 dpi from the edge direction detecting unit 140 is supplied to the image data outputting unit 310 via a switch 400 shown in FIG. 1 when the switch 400 is set to the side of the edge direction detecting unit 140 in the bit map image output mode by the switching signal SW from the system control unit 500 shown in FIG. 1. The 2-bit edge direction detection flag EF from the edge direction detecting unit 140 is directly supplied to the image data outputting unit 310.

Figure 21:
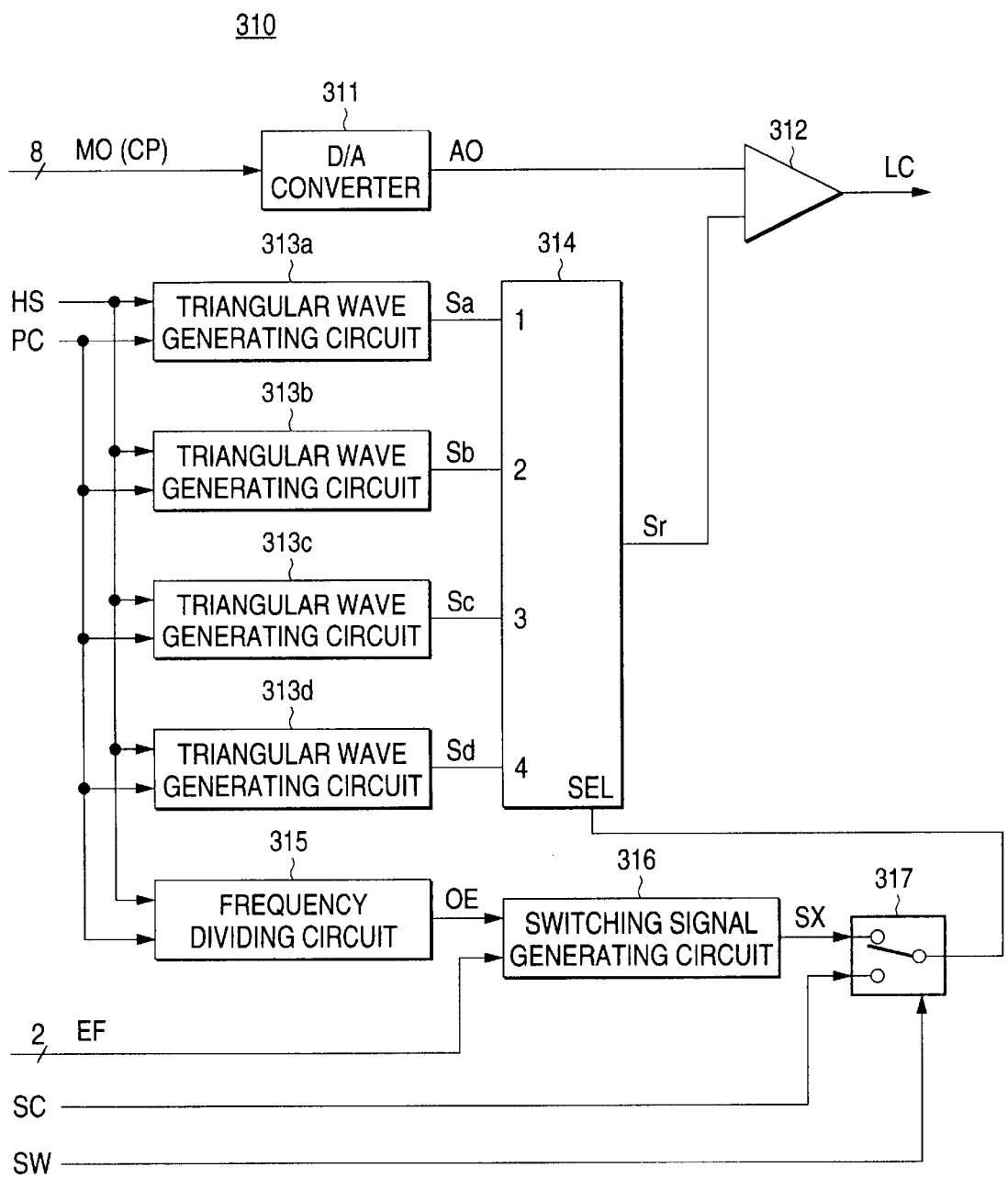
FIG. 21 is a block diagram showing an example of an image data outputting unit.

FIG. 21 shows an example of the image data outputting unit 310. In the bit map image output mode, the 8-bit multivalue image data MO having a resolution of 400 dpi is converted into an analog signal by the D/A converter 311, so as to obtain an output image signal AO. The output image signal AO is supplied to the comparator 312.

Figure 22:
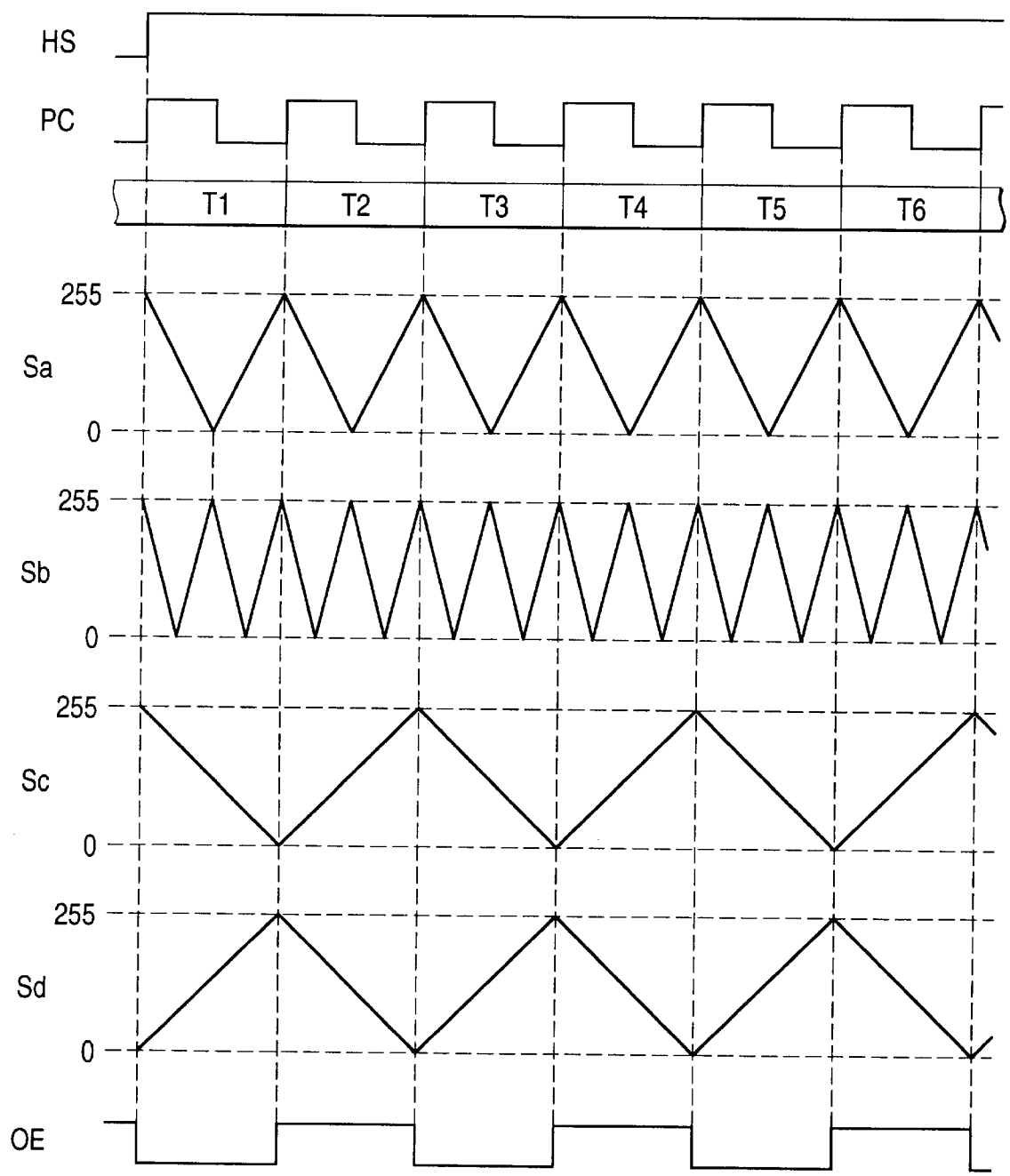
FIG. 22 is a diagram used for illustrating image data output.

In synchronization with a line synchronization signal (a clock signal of one line period) HS and a pixel clock signal (a clock signal of one pixel period) PC, as shown in FIG. 22, triangular wave generating circuits 313a, 313b, 313c, and 313d respectively generate a triangular wave Sa having one pixel period, a triangular wave Sb having a period which is a half of that of the triangular wave Sa, a triangular wave Sc having a period which is two times that of the triangular wave Sa, and a triangular wave Sd having a period which is two times that of the triangular wave Sa, similarly to the triangular wave Sc, but inverted in phase with respect to the triangular wave Sc. These triangular waves Sa to Sd are supplied to a selector 314.

The maximum and minimum values of the triangular waves Sa to Sd are equal to the maximum and minimum levels of the output image signal AO obtained when the multivalue image data MO has the value of "255" and "0", respectively.

A frequency dividing circuit 314 is reset by the line synchronization signal HS and divides the frequency of the pixel clock signal PC by 2. The frequency dividing circuit 314 produces a signal OE for distinguishing odd-numbered pixel periods Ti, T3, . . . in each line from even-numbered pixel periods T2, T4, . . . as shown in FIG. 22. The signal OE and the 2-bit edge direction detection flag EF from the edge direction detecting unit 140 are supplied to a switching signal generating circuit 316. The switching signal generating circuit 316 generates a signal SX which is used for switching the selector 314 in the way described below. A switch 317 is set to the side of the switching signal generating circuit 316 by the switching signal SW from the system control unit 500 in the bit map image output mode, so that the signal SX is supplied to the selector 314 via the switch 317.

As the reference wave Sr from the selector 314, a triangular wave is selected in the following manner. As shown in FIG. 23, when the edge direction detection flag EF is "00" indicating that there is no edge, the triangular wave Sa is selected, irrespective of an odd-numbered pixel period or an even-numbered pixel period. When the edge direction detection flag EF is "01" indicating that the edge direction is "upward" or "downward", the triangular wave Sb is selected, irrespective of an odd-numbered pixel period or an even-numbered pixel period.

When the edge direction detection flag EF is "10" indicating that the edge direction is "rightward", the triangular wave Sc is selected in an odd-numbered pixel period, and the triangular wave Sd is selected in an even-numbered pixel period. When the edge direction detection flag EF is "11" indicating that the edge direction is "leftward", conversely, the triangular wave Sd is selected in an odd-numbered pixel period, and the triangular wave Sc is selected in an even-numbered pixel period.

The reference wave Sr from the selector 314 is supplied to the comparator 312. From the comparator 312, the record control signal LC is obtained. During the period when the output image signal AO exceeds in level the reference wave Sr, the record control signal LC is at the high level which allows the recording laser of the printer unit 320 to be turned on, and, during the period when the output image signal AO is equal to or smaller in level than the reference wave Sr, the record control signal LC is at the low level which allows the recording laser to be turned OFF.

Figure 24:
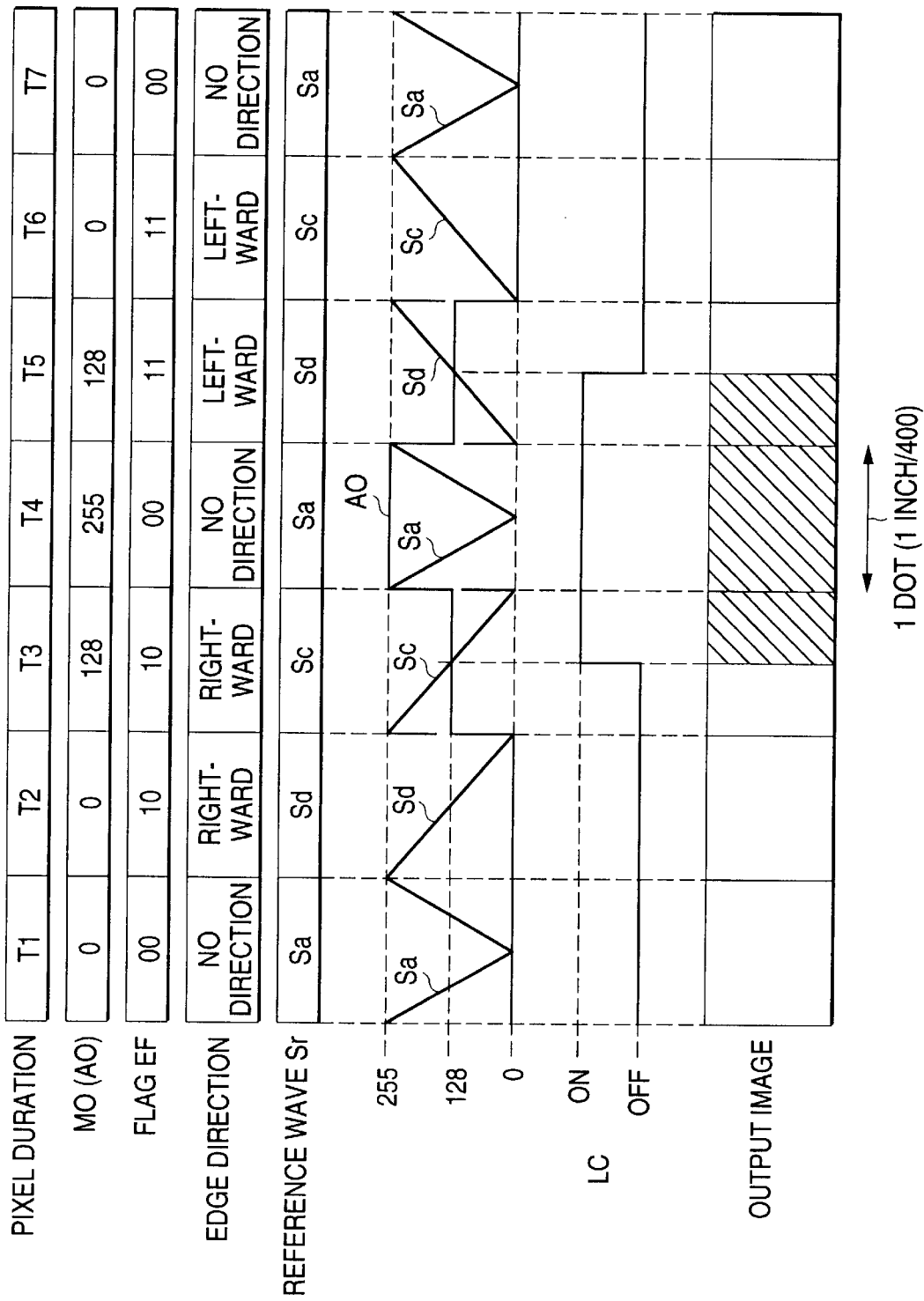
FIG. 24 is a diagram used for illustrating image data output.

Accordingly, for example, when the value of the multivalue image data MO or the level of the output image signal AO, and the contents of the edge direction detection flag EF or the edge direction indicated by the contents have values shown in FIG. 24 in the respective pixel periods T1 to T7, the triangular waves Sa, Sd, Sc, Sa, Sd, Sc, and Sa are selected as the reference wave Sr in the pixel periods T1, T2, T3, T4, T5, T6, and T7, respectively. As a result, the record control signal LC is in the on-state during the entire pixel period T4 in which the multivalue image data MO has the value of "255". Regarding the immediately preceding pixel period T3 and the immediately succeeding pixel period T5, in part of each of the periods which is closer to the pixel period T4, the record control signal LC is in the on-state so as to be continuously in the on-state during a period spreading over the pixel periods T3 to T5.

In the example, the printer unit 320 is a laser beam printer of the so-called image lighting type in which a toner adheres to a portion on a photosensitive body which portion is irradiated with the recording laser beam, and the toner image is then transferred to a sheet to form a black image. Accordingly, as indicated by the hatched portion in FIG. 24, a black image which is continuous over 3 pixels (3 dots) is formed in the output image.

Figure 25:
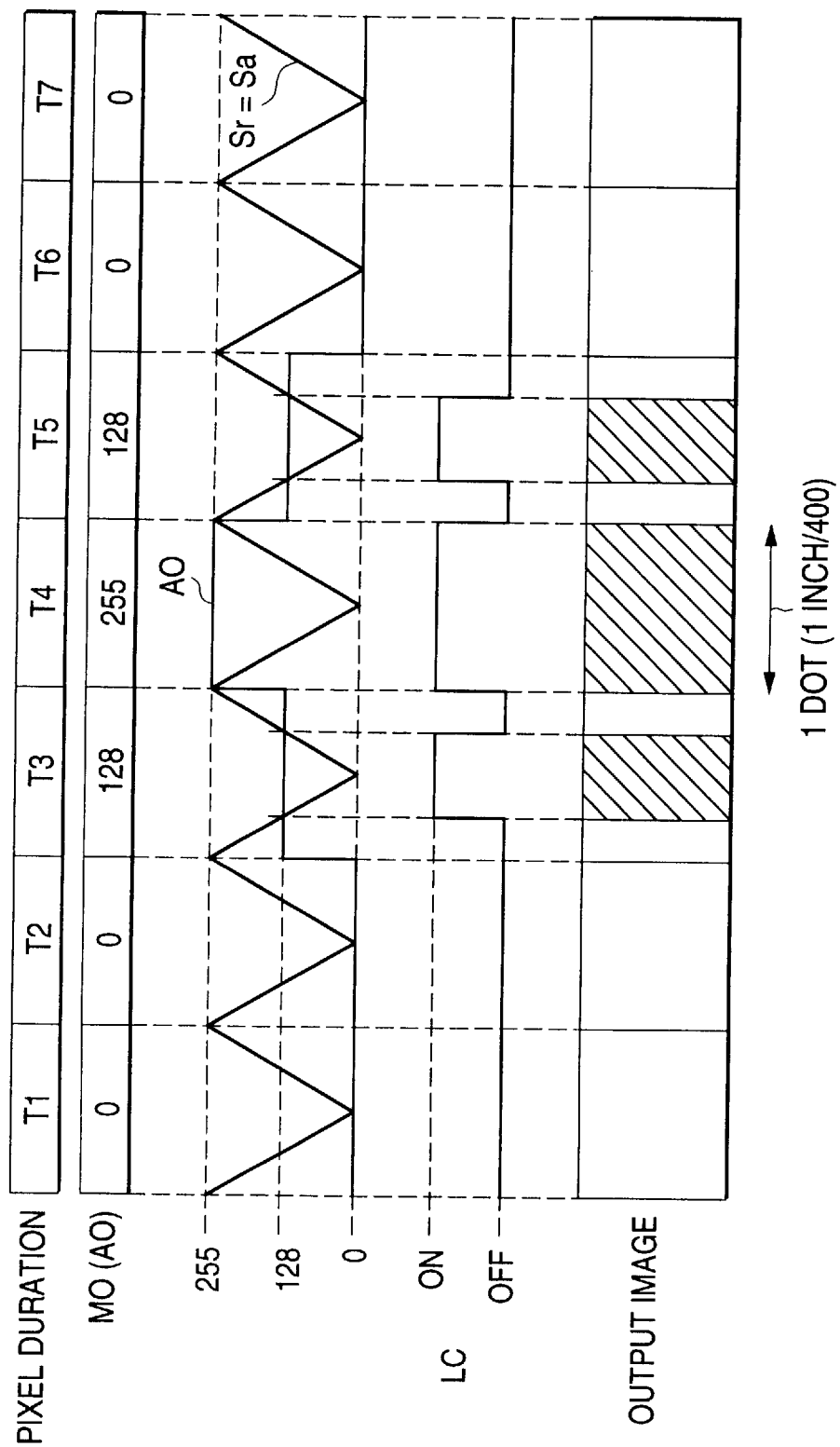
FIG. 25 is a diagram used for illustrating image data output.

By contrast, when the triangular waves Sa to Sd are not selected as described above or the triangular wave Sa having the one pixel period is always used as the reference wave Sr, the record control signal LC is turned on in each pixel period in a separate manner as shown in FIG. 25. As a result, in the output image, as indicated by the hatched portions in the figure, a black image which is separated in each pixel (dot) is formed.

As apparent from FIGS. 24 and 25, according to the above-described example in which one of the triangular waves Sa to Sd is selected as the reference wave Sr in accordance with the edge direction of the multivalue image data MO and whether the pixel period is an odd-numbered one or an even numbered one, a clear electrostatic latent image is formed on the photosensitive body, and a clear output image is obtained on a sheet, as compared with the case where the triangular wave Sa is always used as the reference wave Sr. In addition, according to the example, jags in an oblique line portion and a curve portion in characters, graphics, and the like can be reduced as described later, so that the oblique line portion and the curve portion are output in a smooth form.

In the copy mode, however, the triangular wave Sa having one pixel period is always used as the reference wave Sr as described later, so that the gradation representation such as intermediate tone levels is stably and satisfactorily performed.

Figure 32:
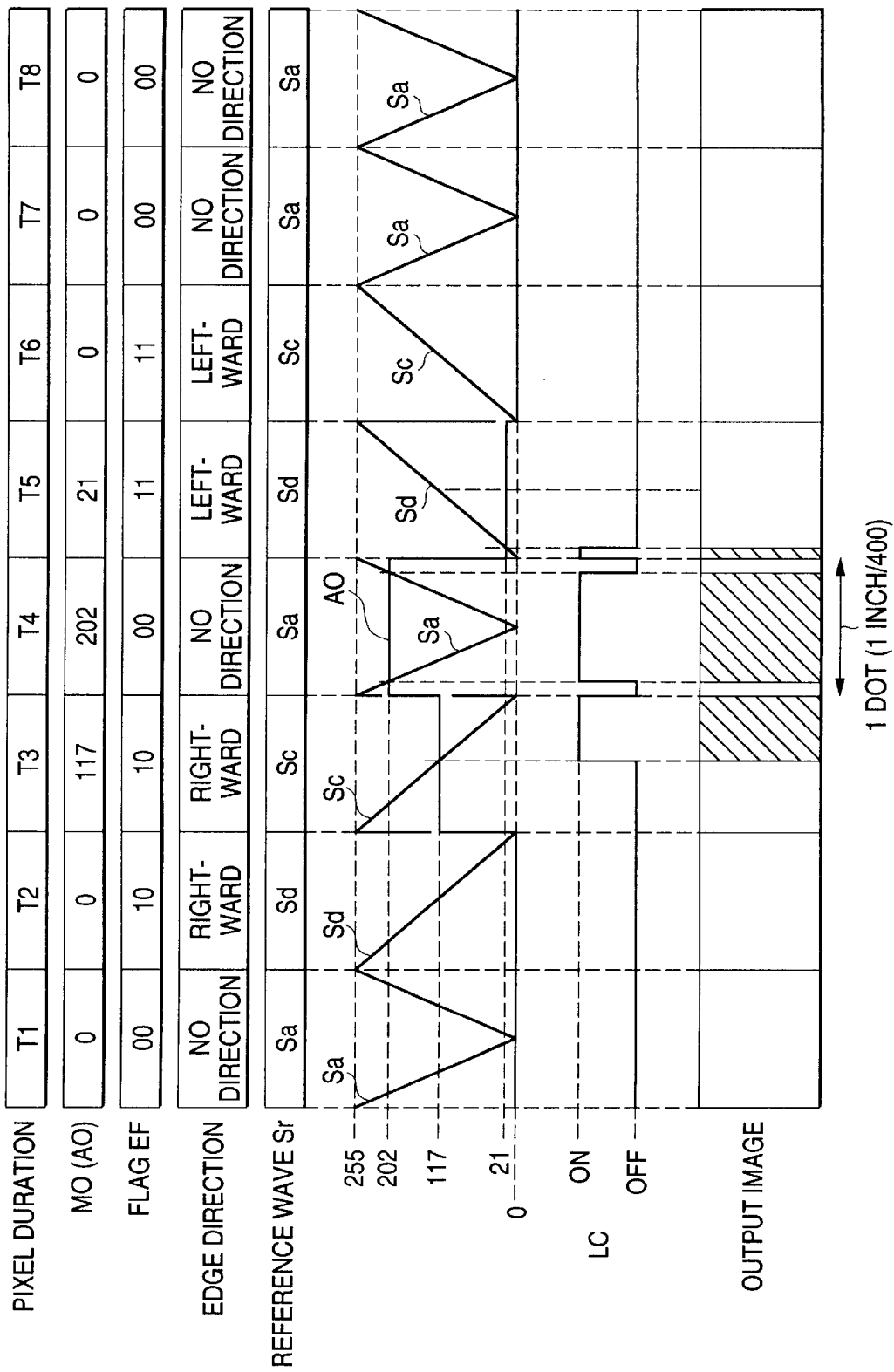
FIG. 32 is a diagram used for illustrating image data output.

For the sake of convenience, the generation of the record control signal LC in the image data outputting unit 310 in the bit map image output mode, and the formation of an output image in the printer portion 320 using the signal will be described by way of an example case where the data values of the 8-bit multivalue image data MO having a resolution of 400 dpi have the specifically illustrated values with respect to 8×4 pixels as shown in FIG. 30. In the example case, it is also assumed that the 2-bit edge direction detection flag EF generated therefrom has the specific contents illustrated in FIG. 31 for the 8×4 pixels, respectively. In the first line of the image of 8×4 pixels, the value of the multivalue image data MO or the level of the output image signal AO, the contents of the edge direction detection flag EF or the edge direction indicated by the contents, the triangular wave selected as the reference wave Sr, the record control signal LC, and the output image are as shown in FIG. 32.

Figure 33:
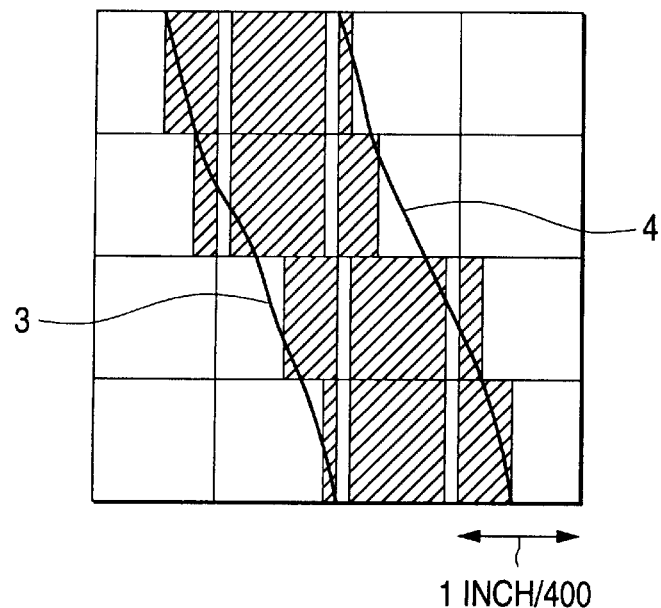
FIG. 33 is a diagram showing an example of an output image according to the image processing apparatus of the invention.

Accordingly, for the center portion of 4×4 pixels of the image of the 8×4 pixels, the recording laser is turned on in the hatched portions of FIG. 33, so as to form an output image in which two curves 3 and 4 shown in the figure are outlines.

Figure 34:
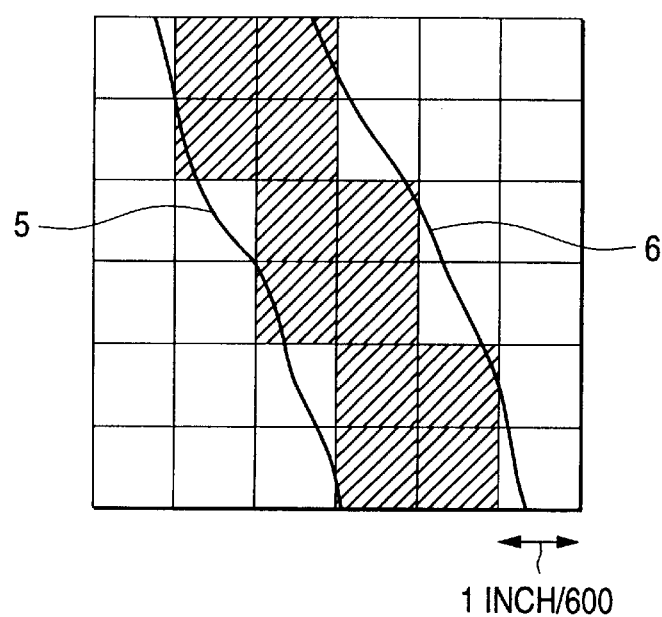
FIG. 34 is a diagram showing an example of an output image in the case where input bit map image data is directly output.
Figure 35:
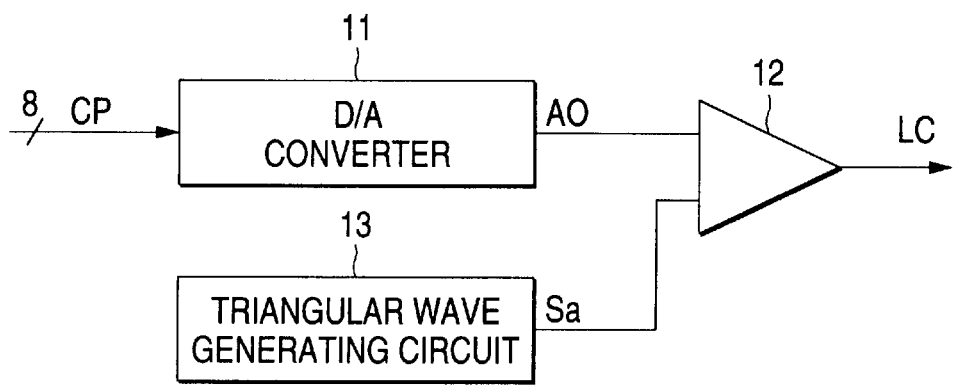
FIG. 35 is a block diagram showing an example of an image data outputting unit of a digital copy machine.
Figure 36:
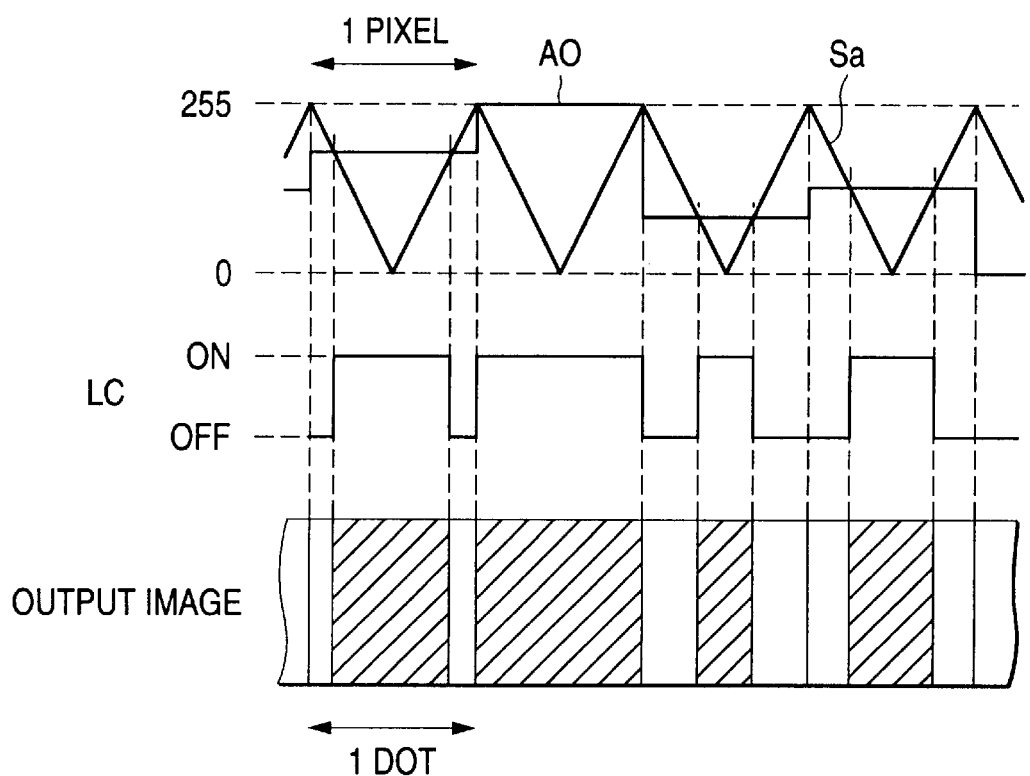
FIG. 36 is a diagram used for illustrating the example.

By contrast, in the case where the input bit map image data BM having a resolution of 600 dpi shown in FIG. 28 is directly supplied to the printer unit 320, and the recording laser is turned on when the respective binary image data is "1", for the center portion 2 of 6×6 pixels of the image including 14×8 pixels, the recording laser is turned on in the hatched portions of FIG. 34. As a result, an output image in which two curves 5 and 6 shown in the figure are outlines is formed.

Accordingly, as apparent from FIGS. 33 and 34, according to the above-described example, even when the output resolution is lowered to 400 dpi, there is no degradation in the quality of the output image. As compared with the case where the input bit map image having a resolution of 600 dpi is directly output, jags in an oblique line portion and a curve portion in characters, graphics, and the like can be reduced so that the oblique line portion and the curve portion can be output in a smooth form.

Although not shown in FIGS. 24 and 32, when the edge direction detection flag EF is "01" indicating that the edge direction is "upward" or "downward", the triangular wave Sb having a ½-period of the pixel clock signal PC is selected as the reference wave Sr in the image data outputting unit 310 as described above with reference to FIG. 23.

Figure 26:
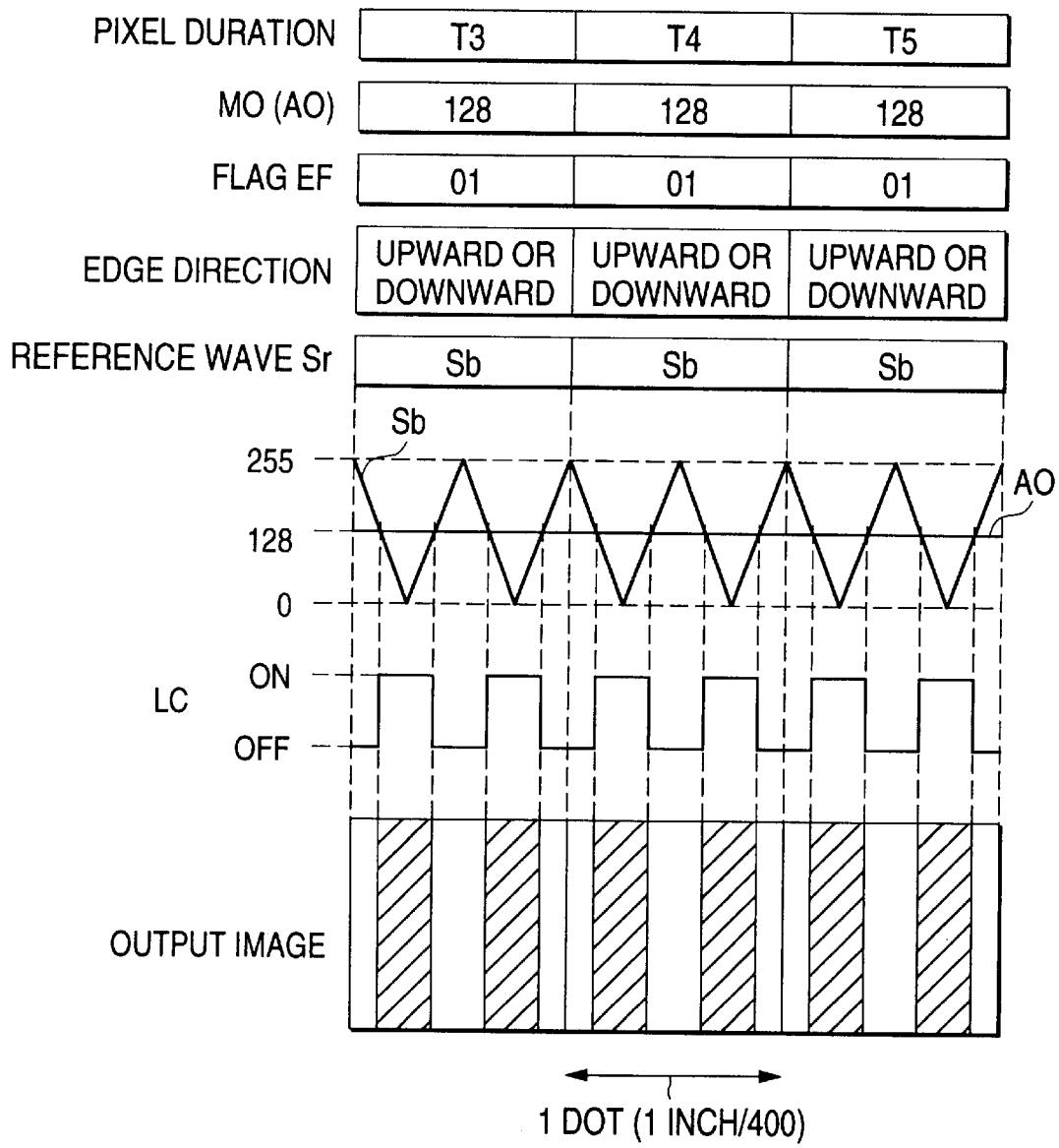
FIG. 26 is a diagram used for illustrating image data output.

Accordingly, for example, if the value of the multivalue image data MO or the level of the output image signal AO, and the contents of the edge direction detection flag EF or the edge direction indicated by the contents have the values shown in FIG. 26 in the pixel periods T3 to T5, the triangular wave Sb is selected as the reference wave Sr in the pixel periods T3 to T5. As a result, the record control signal LC is separately turned on twice in each pixel period, so that, also in the output image, a black image which is separated into two parts in each pixel (dot) as indicated by the hatched portions in the figure is formed.

Accordingly, for example, when the multivalue image data MO for a certain portion of 3×3 pixels has the values shown in A of FIG. 27 and the edge direction for each of the pixels is "upward" or "downward", the recording laser is turned on in the hatched portions in B of the figure for the portion. However, due to the characteristics of the laser beam printer of the electrophotography type which is used as the printer unit 320, the adherence of toner is pulled to the on-side in the subscanning direction. In an actual output image, therefore, a black image is formed as indicated by the hatched portions in C of the figure, and the line width is controlled also in the subscanning direction.

In the copy mode, the image inputting unit 210 shown in FIG. 1 reads an original with a resolution of 400 dpi, and produces the input image data. The input image data is processed in the image processing section 220, so that 8-bit multivalue image data CP having a resolution of 400 dpi is obtained from the image processing section 220. In the copy mode, the switch 400 is set to the side of the image processing section 220 by the switching signal SW from the system control unit 500, so that the multivalue image data CP is supplied to the image data outputting unit 310 via the switch 400. In addition, the switching signal SC for the copy mode from the system control unit 500 is directly supplied to the image data outputting unit 310.

In the image data outputting unit 310, as shown in FIG. 21, the 8-bit multivalue image data CP having a resolution of 400 dpi is converted into an analog signal by the D/A converter 311 in the same way as that performed for the multivalue image data MO in the bit map image output mode, so that an output image signal AO is obtained. In the copy mode, the switch 317 is set to the side of the system control unit 500 by the switching signal SW from the system control unit 500. As a result, the switching signal SC is supplied to the selector 314 via the switch 317, so that the triangular wave Sa having one pixel period is always selected by the selector 314 as the reference wave Sr.

Accordingly, in the copy mode, the record control signal LC is turned on in each pixel period in a separate manner as shown in FIG. 25. As a result, in the output image, as indicated by the hatched portions in the figure, a black image which is separated for each pixel (dot) is formed, so that the gradation representation such as intermediate tone levels is stably and satisfactorily performed.

In the case where the printer system has also a function as a facsimile, the printer system shown in FIG. 1 is configured in the following manner. Another resolution converting unit is disposed in parallel to the resolution converting unit 130. In the facsimile receiving mode, input bit map image data having a resolution of, for example, 200 dpi which is obtained at the input terminal 110 as a result of the facsimile receiving process is converted into 8-bit multivalue image data having a resolution of 200 dpi by the binary-to-multivalue converting unit 120. The multivalue image data is converted into 8-bit multivalue image data having a resolution of 400 dpi by the other resolution converting unit. The edge direction of the multivalue image data is detected by the edge direction converting unit 140.

In this case, the other resolution converting unit which converts 8-bit multivalue image data having a resolution of, for example, 200 dpi into 8-bit multivalue image data having a resolution of 400 dpi can be implemented by using the bilinear method, the 3-dimensional convolution interpolation method, or the like.

The invention may be applied also to a printer system for a color image in the following manner. Bit map image data for the color image consists of bit map image data for multiple colors such as four colors, i.e., yellow, magenta, cyan, and black. The bit map image data for the multiple colors are obtained at the input terminal 110 shown in FIG. 1, in a face sequential manner. The bit map image data for the multiple colors are converted into multivalue image data for multiple colors having a resolution which is equal to that of the bit map image data, by the binary-to-multivalue converting unit 120 in a plane sequential manner. The multivalue image data for the multiple colors are converted into multivalue image data for multiple colors having a resolution which is equal to as the output resolution of the image output apparatus 300, by the resolution converting unit 130 in a plane sequential manner. The edge directions of the multivalue image data for the multiple colors after the resolution conversion are detected by the edge direction detecting unit 140 in a plane sequential manner.

In the process, if color conversion is required for the image data, the color conversion may be performed on the input side of the binary-to-multivalue converting unit 120, between the binary-to-multivalue converting unit 120 and the resolution converting unit 130, between the resolution converting unit 130 and the edge direction detecting unit 140, or on the output side of the edge direction detecting unit 140.

Also in the copy mode, for example, input multivalue image data for red, green, and blue are simultaneously obtained from the image inputting unit 210, and output multivalue image data of yellow, magenta, cyan, and black are obtained from the image processing section 220, in a plane sequential manner.

The binary-to-multivalue converting unit 120 may be implemented by using a logic circuit constituted by an AND gate and an OR gate, in place of the LUT 129 having the ROM or RAM configuration.

The resolution converting unit 130 may be implemented by using the bilinear method, the 3-dimensional convolution interpolation method, or the like instead of the above-mentioned projection method.

The block segmentation in the edge direction detecting unit 140 may have a larger size than the size of 3×3 pixels.

In the edge direction detecting unit 140, as apparent from FIGS. 24, 31, 32, and 33, the detected edge direction is not necessarily "upward" or "downward". It is sufficient that the detected edge direction is "rightward" or "leftward".

In the image data outputting unit 310, as apparent from FIGS. 24 and 32, it is sufficient for a wave which is to be used as the reference wave Sr to have a waveform which linearly varies from the maximum value to the minimum value in the pixel period when the edge direction is "rightward", and a waveform which linearly varies from the minimum value to the maximum value in the pixel period when the edge direction is "leftward". As the reference wave Sr, therefore, a saw-tooth wave may be selected which has different tilt directions in the pixel period when the edge direction is "rightward" and in the pixel period when the edge direction is "leftward". In addition, it is not always necessary to determine whether the pixel period is an odd-numbered one or an even-numbered one.

When the edge direction is "upward" or "downward", the triangular wave Sa having one pixel period may be selected as the reference wave Sr in the same manner as the case where there is no edge.

As described above, according to the invention, in the printer system having a function as a bit map printer and a function as a digital copy machine, jags in an oblique line portion and a curve portion in characters, graphics, and the like can be reduced, and the oblique line portion and the curve portion can be output in a smooth form, even in the case where the output resolution of the image output apparatus is suppressed to or lower than a certain degree because of the reasons such as that the gradation representation such as intermediate tone levels must be stably and satisfactorily performed, so that the resolution of the input bit map image cannot be converted into a higher resolution, and rather the resolution of the input bit map image is lowered in accordance with the output resolution of the image output apparatus.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image processing apparatus, comprising:

an image data converting unit for converting input bit map image data having a resolution which is different from an output resolution of an image output apparatus, into a multivalue image data having a resolution which is equal to the output resolution of said output apparatus;

an edge direction detection unit for detecting an edge direction of the multivalue image data from said image data converting unit and generating an edge direction detection signal by multiplying the multivalue image data by a set of convolution coefficients; and an image data outputting unit for outputting the multivalue image data from said image data converting unit, based on the edge direction detection signal from said edge direction detection unit and a variable reference wave.

2. An image processing apparatus according to claim 1, wherein said image data converting unit comprises:

a binary-to-multivalue converting unit for converting the input bit map image data into multivalue image data having a resolution which is equal to the resolution of the input bit map image data; and a resolution converting unit for converting the multivalue image data from said binary-to-multivalue converting un it into multivalue image data having a resolution which is equal to the output resolution of said image out put apparatus.

3. An image processing apparatus according to claim 1, wherein said image data outputting unit utilizes the variable reference wave in which at least a tilt direction is changed in accordance with said edge direction detection signal from said edge direction detecting unit to output the multivalue image data from said image data converting unit.

4. An image processing apparatus according to claim 1, wherein said image data outputting unit utilizes the variable reference wave in which at least a tilt direction is changed in accordance with said edge direction detection signal from said edge direction detecting unit to output the multivalue image data from said image data converting unit.

5. An image processing apparatus according to claim 3, wherein said reference wave is a triangular wave.

6. An image processing apparatus according to claim 4, wherein said reference wave is a triangular wave.

* * * * *

UNITED STATES PATENT AND TRADEMARK OFFICE
CERTIFICATE OF CORRECTION

PATENT NO. : 5,805,304
DATED : September 8, 1998
INVENTOR(S) : SEKINE

It is certified that error appears in the above-indentified patent and that said Letters Patent is hereby corrected as shown below:

Title Page, in the "Attorney, Agent, or Firm", line 2, "Garret" should read --Garrett--.

Claim 2, column 18, line 41, "un it" should read --unit--.

Claim 2, column 18, line 42, "out" should read --out---.

Signed and Sealed this

Seventeenth Day of August, 1999

Attest:

Q. TODD DICKINSON

*Attesting Officer*     *Acting Commissioner of Patents and Trademarks*